(12) United States Patent
Kamiya et al.

(10) Patent No.: US 8,334,991 B2
(45) Date of Patent: Dec. 18, 2012

(54) APPARATUS AND METHOD FOR RESTRICTING FILE OPERATIONS

(75) Inventors: Yuka Kamiya, Machida (JP); Akari Matsumura, Tokyo (JP); Munetaka Sakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/400,923

(22) Filed: Feb. 21, 2012

(65) Prior Publication Data

US 2012/0147425 A1 Jun. 14, 2012

Related U.S. Application Data

(63) Continuation of application No. 11/997,368, filed as application No. PCT/JP2006/317407 on Aug. 29, 2006, now Pat. No. 8,237,939.

(30) Foreign Application Priority Data

Sep. 1, 2005 (JP) .................................. 2005-253796
Aug. 11, 2006 (JP) .................................. 2006-220645

(51) Int. Cl.
*G06F 3/12* (2006.01)
*G06K 15/02* (2006.01)
(52) U.S. Cl. ...................... 358/1.13; 358/1.14; 358/1.15
(58) Field of Classification Search .................. 358/1.1, 358/1.13, 1.14, 1.15, 401, 403
See application file for complete search history.

(56) References Cited

U.S. PATENT DOCUMENTS

| | | | |
|---|---|---|---|
| 5,633,932 A | 5/1997 | Davis et al. | |
| 6,745,334 B1 | 6/2004 | Ikegami | |
| 7,313,699 B2 | 12/2007 | Koga | |
| 7,532,769 B2 | 5/2009 | Ono et al. | |
| 2003/0217010 A1 | 11/2003 | Stefik et al. | |
| 2005/0108549 A1 | 5/2005 | Kanai | |
| 2005/0280855 A1* | 12/2005 | Ono et al. ................. | 358/1.13 |
| 2006/0290963 A1 | 12/2006 | Sakuraba et al. | |

FOREIGN PATENT DOCUMENTS

| | | |
|---|---|---|
| EP | 1091275 A2 | 4/2001 |
| EP | 1475775 A2 | 11/2004 |
| JP | 11-227267 A | 8/1999 |
| JP | 2000-309148 A | 11/2000 |
| JP | 2001-117744 A | 4/2001 |

(Continued)

OTHER PUBLICATIONS

Office Action which issued on Feb. 27, 2012, in counterpart Japanese application No. 2006-220645.

(Continued)

*Primary Examiner* — Thomas D Lee
(74) *Attorney, Agent, or Firm* — Fitzpatrick, Cella, Harper & Scinto

(57) ABSTRACT

An information processing apparatus determines whether a particular operation on a first file, for example, is restricted or not. The information processing apparatus also restricts the particular operation on a second file related to the first file if the particular operation on the first file is restricted.

8 Claims, 28 Drawing Sheets

FOREIGN PATENT DOCUMENTS

| | | |
|---|---|---|
| JP | 2002-236577 A | 8/2002 |
| JP | 2002-269093 A | 9/2002 |
| JP | 2003-186831 A | 7/2003 |
| JP | 2003-271437 A | 9/2003 |
| JP | 2004-054658 A | 2/2004 |
| JP | 2004-152261 A | 5/2004 |
| JP | 2004-152263 A | 5/2004 |
| JP | 2006-001089 A | 1/2006 |
| JP | 2007-004683 A | 1/2007 |
| WO | 2005/055022 A1 | 6/2005 |

OTHER PUBLICATIONS

"Achieving the Dual Goal of Digitization and Protection of Information through Dynamic Access control of Documents", Adobe LiveCycle Policy Server, Nikkei BP Government Technology, Japan Nikkei Business Publications, Inc., Apr. 1, 2005, No. 007, Spring 2005, p. 120-121, Japan.

Search report issued on Apr. 27, 2012, in counterpart European application No. 06797334.7.

* cited by examiner

FIG. 2

| DOCUMENT ID | USER NAME | OPERATION RIGHTS | | | | |
|---|---|---|---|---|---|---|
| | | VIEW | EDIT | DELETION | COPY | PRINT |
| #00001 | USER A | ○ | ○ | ○ | ○ | ○ |
| | USER B | ○ | ○ | | ○ | ○ |
| | USER C | ○ | | | | |
| | USER D | ○ | | | ○ | ○ |
| #00002 | USER A | ○ | ○ | | | |
| | USER B | ○ | | ○ | ○ | ○ |
| | USER C | ○ | | | | ○ |

FIG. 3

LICENSE INFORMATION

DOCUMENT ID : #00001

FILE NAME : file1

TITLE : Title

CREATOR : creater

CREATION DATE AND TIME : D:20050314200540

LAST UPDATE DATE AND TIME : D:20050314200733

F I G. 12A

1201

| BOX NUMBER | DOCUMENT NAME | DATE | TIME | DOCUMENT FILE NAME | LICENSE INFORMATION |
|---|---|---|---|---|---|
| 03 | DOCUMENT NAME 1 | 06/09 | 12:00 | DOCUMENT NAME 1.img | DOCUMENT NAME 1.lic |
| 03 | DOCUMENT NAME 2 | 06/08 | 18:00 | DOCUMENT NAME 2.img | |
| 03 | DOCUMENT NAME 3 | 07/04 | 20:30 | DOCUMENT NAME 3.img | DOCUMENT NAME 3.lic |
| 03 | DOCUMENT NAME 4 | 07/09 | 21:00 | DOCUMENT NAME 4.img | |
| 03 | DOCUMENT NAME 5 | 07/15 | 17:00 | DOCUMENT NAME 5.img | DOCUMENT NAME 5.lic |

| 1212 | 1213 | 1214 | 1215 | 1216 | 1217 | 1218 | 1219 |
|---|---|---|---|---|---|---|---|
| BOX NUMBER | DOCUMENT NAME | DATE | TIME | DOCUMENT FILE NAME | PASSWORD | RELATED GENERAL-FORMAT DOCUMENT | ATTRIBUTE INFORMATION |
| 4 | DOCUMENT NAME 6 | 06/10 | 12:30 | DOCUMENT NAME 6.jpg | ABABC | DOCUMENT NAME 6.img | VIEW/PRINT |
| 4 | DOCUMENT NAME 7 | 06/11 | 14:45 | DOCUMENT NAME 7.jpg | | | |
| 5 | DOCUMENT NAME 8 | 07/15 | 08:30 | DOCUMENT NAME 8.jpg | WWXYZ | DOCUMENT NAME 8.img | VIEW/PRINT/EDIT |
| 6 | DOCUMENT NAME 9 | 12/14 | 20:45 | DOCUMENT NAME 9.jpg | JJKKL | DOCUMENT NAME 9.img | |
| 7 | DOCUMENT NAME 10 | 02/28 | 22:50 | DOCUMENT NAME 10.jpg | MMNNB | DOCUMENT NAME 10.img | VIEW |

FIG. 23

| DOCUMENT LICENSE ID | USER NEME | OPERATION RIGHTS ||||| PRINT SETTING STAMP |
|---|---|---|---|---|---|---|---|
| | | VIEW | EDIT | DELETION | COPY | PRINT | |
| #00001 | USER A | ○ | ○ | ○ | ○ | ○ | NONE |
| | USER B | ○ | ○ | | ○ | ○ | COPY PROHIBITED |
| | USER C | ○ | | | | | / |
| | USER D | ○ | | | ○ | ○ | NONE |
| #00002 | USER A | ○ | ○ | ○ | | | / |
| | USER B | ○ | | | ○ | ○ | CONFIDENTIAL |
| | USER C | ○ | | | | ○ | CONFIDENTIAL |

APPARATUS AND METHOD FOR RESTRICTING FILE OPERATIONS

RELATED APPLICATIONS

This application is a continuation of application Ser. No. 11/997,368, filed Jan. 30, 2008. It claims benefit of that application under 35 U.S.C. §120, and claims benefit under 35 U.S.C. §119 of Japanese Patent Applications Nos. 2005-253796 and 2006-220645, filed on Sep. 1, 2005, and Aug. 11, 2006, respectively. The entire contents of each of the mentioned prior applications are incorporated herein by reference.

BACKGROUND OF THE INVENTION

1. Field of the Invention

The present invention relates to an apparatus and method for restricting predetermined operations on electronic documents in an information processing apparatus.

2. Description of Related Art

Computerized documents (hereinafter referred to as electronic documents) are frequently used today. Electronic documents are very convenient because they can be readily sent from one party to another party by way of E-mail attachments. On the other hand, new kinds of problems such as leakage of information are occurred while distribution of electronic documents is easy.

Today, a technique for restricting operations such as display, edit, and print operations have been introduced for some types of files such as PDF (Portable Document Format) files. Only authorized users are allowed to perform operations, such as printing, of such files.

In image forming apparatuses, print job data sent from a host computer through a network is bitmapped to generate image data for printing. The image data is temporarily stored in a hard disk drive of the image forming apparatus. However, the data may be held in the hard disk drive after completion of printing. The purpose of this is to read the image data of any of the originals stored in the hard disk drive to print it again. The image data can be sent to another apparatus. The function of storing a frequently used electronic documents in a document box provided in a hard disk drive in this way is called the document box function. A document box is like a folder or directory in a file system.

Image data of confidential documents may be stored in a document box. Therefore, it is desirable that only predetermined users are allowed to access document boxes. According to Japanese Patent Laid-Open No. 11-227267, a password is set for a document box so as to allow only the users who know the password to access image data in the document box.

As described above, even image data of an electronic document on which operations are restricted on a host computer may be held in an image forming apparatus after printing operation is performed. Predetermined operations on the image data thus generated for printing cannot be restricted in the same way they are restricted on the original electronic document. In some cases, operations on an electronic document are restricted but operations on data in an image format specific to an image forming apparatus are not restricted. Both of them can be generated by scanning an original document and stored in the image forming apparatus. In such cases, operation restrictions equivalent to those applied on the electronic document cannot be applied on the data in the image format specific to the image forming apparatus.

If image data is stored in a document box described in Japanese Patent Laid-Open No. 11-227267, access to the image data can be restricted through use of a password. However, once the image data is transferred as an email attachment from the image forming apparatus to another apparatus, the image data can no longer be protected. That is, the technique described in Japanese Patent Laid-Open No. 11-227267 cannot appropriately protect image data once it is retrieved from a document box.

SUMMARY OF THE INVENTION

An information processing apparatus according to the present invention determines, for example, whether a predetermined operation on a first file is restricted or not. If the predetermined operation on the first file is restricted, the information processing apparatus also restricts the predetermined operation on a second file related to the first file.

According to the present invention, if a given operation on the first file is restricted, the given operation on the second file related to the first file is also restricted. Thus, restrictions of operation on the second file that are equivalent to the restrictions of operation on the first file can be provided.

Further features of the present invention will become apparent from the following description of exemplary embodiments with reference to the attached drawings.

BRIEF DESCRIPTION OF DRAWINGS

FIG. 2 shows an example of an operation rights database according to an embodiment;

FIG. 3 shows an exemplary license information according to an embodiment;

FIGS. 12A and 12B show an exemplary document management table according to an embodiment;

FIG. 23 shows another exemplary operation restriction database according to an embodiment;

BEST MODE FOR CARRYING OUT THE INVENTION

Description of embodiments will be given below which would be helpful for understanding the superordinate conception, the middle conception, and lower conception of the present invention. It should be noted that not all conceptions included in the embodiment described below are set forth in the claims. Also, it should be understood that the conceptions that are not set fourth in the claims are intentionally excluded from the technical scope of the invention but are not set forth in the claims because they are equivalent to the present invention.

Figure 1:
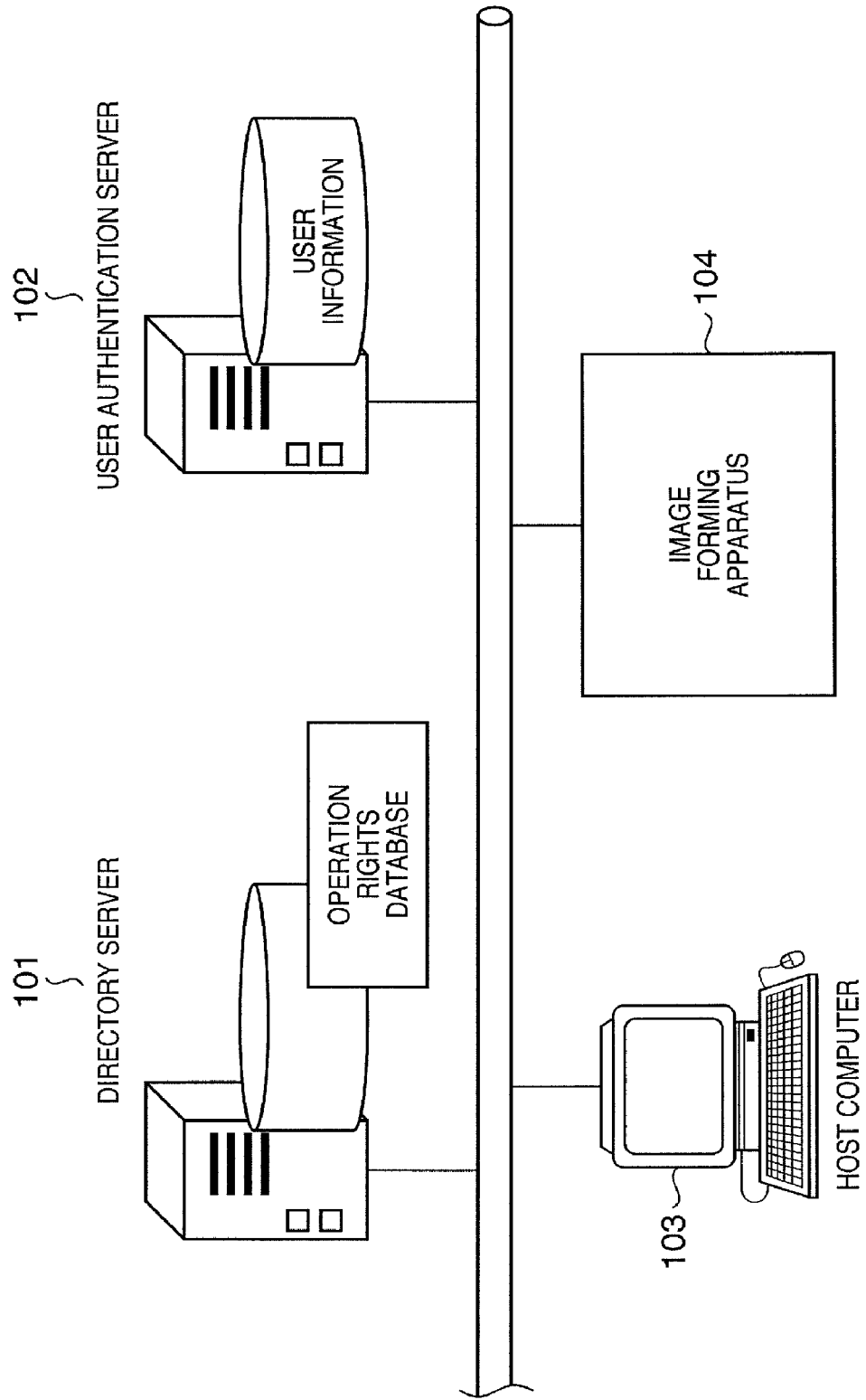
FIG. 1 schematically shows a configuration of an information processing system according to an embodiment of the present invention.

FIG. 1 schematically shows a configuration of an information processing system according to an embodiment. A directory server 101 is a computer which manages information about rights to perform operations on files. Operation right is, for example, right to view an electronic document, right to edit an electronic document, and/or right to print an electronic document. Operation rights are sometimes called access rights. The directory server 101 is sometimes also called an operation rights management server, access rights management server, or policy server. The director server 101 may be a LiveCycle Policy Server from Adobe Systems Incorporated.

A user authentication server 102 is a computer which authenticates users who use a host computer or an image forming apparatus. The host computer 103 is an information processing apparatus such as a personal computer (PC). The image forming apparatus 104 is, for example, a printer, a copying machine, or a multifunctional machine. The image forming apparatus is also a kind of information processing apparatus, of course. These apparatuses are interconnected through networks.

In FIG. 1 one host computer and one image forming apparatus are shown but multiple ones may be shown, respectively. A directory server may have a use authentication function depending on system configuration.

The host computer 103 can use document processing application software to generate or edit electronic documents, or set restrictions on operations on electronic documents. Electronic documents are document or image files. PDF files are well-known electronic documents. The host computer 103 may generate print job data from an electronic document it generated and send it to the image forming apparatus 104. Document processing application software may be, for example, Acrobat from Adobe Systems Incorporated.

The image forming apparatus 104 includes a function such as the functions of copying, printing, faxing, or scanning an original, and box function. The copying function is the function of reading an original and generates a duplication of the original. The printing function is the function of printing a document on the basis of print job data received from the host computer 103. The faxing function is the function of reading an original and sending image data of the original to a destination facsimile machine. The scanning function is the function of reading an original and generating image data. The box function is the function of generating a box for storing an electronic document such as image data, storing an electronic document in the box, printing or sending electronic document stored in the box, and restricting access to an electronic document stored in the box to a predetermined user. A box may be implemented as a folder or directory, for example. The box function is sometimes called the document box function. The names of these functions are given for convenience only.

The image forming apparatus 104 is capable of printing print job data provided from the host computer 103, through a storage unit included in the image forming apparatus 104 by using a printer engine also included in the image forming apparatus 104. The term print job data generally refers to data required for printing. Print job data may be page data written in PDL (Page Description Language).

The user authentication server 102 has a database storing user information (such as IDs and passwords). The user authentication server 102 authenticates a user attempting to log in the host computer 103 or the image forming apparatus 104. For example, if a login request is issued from a user on the host computer 103, the host computer 103 sends user information to the user authentication server 102 to request it to authenticate the user. If the validity of the user information is successfully verified at the user authentication server 102, the user can log onto the host computer 103. The user is an operator who operates an apparatus.

FIG. 2 shows an example of an operation right database according to an embodiment. The operation right database (sometimes referred to as the policy database) is held by the directory server 101. Stored in the database are document IDs, user names, and operation right information in association with each other. A document ID is information identifying an electronic document. A user name is the ID or name of a user. Operation right information indicates whether a user has the right to perform an operation on an electronic document. Examples of operations include browse (display), alteration (edit), deletion, copy, and print operations. A document ID may be a license ID for identifying license information. The license information is used for identifying an operation right to perform an operation on an electronic document. It should be noted that an electronic document itself does not contain operation right information. Instead, license information is held by an electronic document. License information may be held inside an electronic document or may be held externally.

FIG. 3 shows an example of license information according to an embodiment. The license information includes a document ID mentioned above, a file name associated with the electronic document, the title, the author name, creation date and time, and the last update date and time. The document ID is used in common in the license information and the operation right database. Accordingly, information about an operation right can be obtained on the basis of the document ID.

Figure 4:
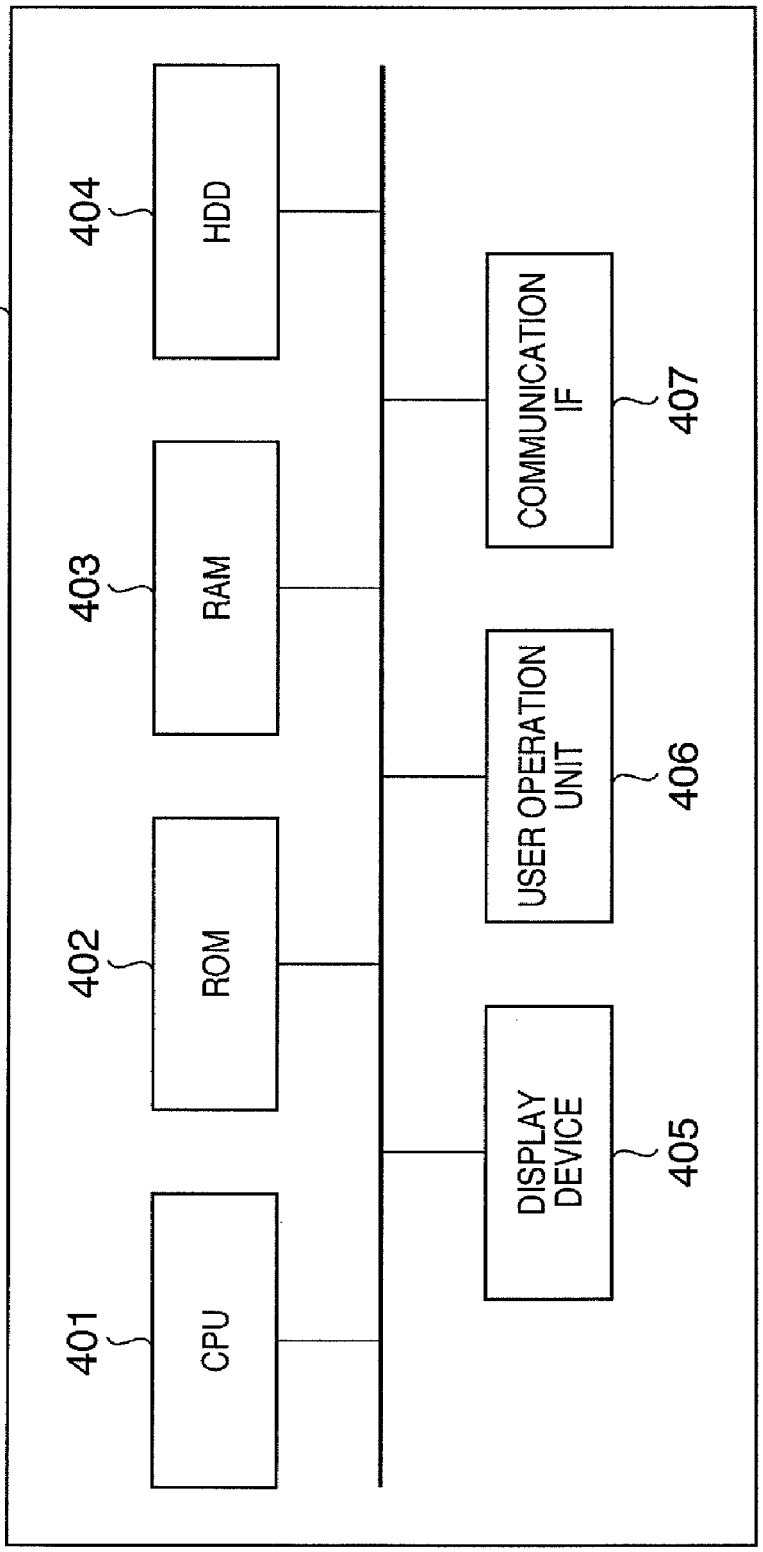
FIG. 4 is a block diagram showing an example of an information processing apparatus according to an embodiment.

FIG. 4 is a block diagram illustrating an information processing apparatus according to an embodiment. In particular, FIG. 4 shows an exemplary hardware configuration of the directory server 101, the user authentication server 102, and the host computer 103. While these computers are not necessarily have the same hardware configuration, it is assumed here for convenience of illustration that they have the same hardware configuration.

A CPU 401 shown is a control unit that centrally controls units of the computer. A ROM 402 is a nonvolatile storage unit storing control programs such as firmware. A RAM 403 is a volatile memory unit that serves as a work area. A hard disk drive (HDD) 404 is a mass-storage unit. A display device 405 is a display unit presenting various kinds of information to users. A user operation unit 406 is an input unit such as a pointing device and a keyboard. A communication interface 407 is a communication unit such as a network communication card.

Figure 5:
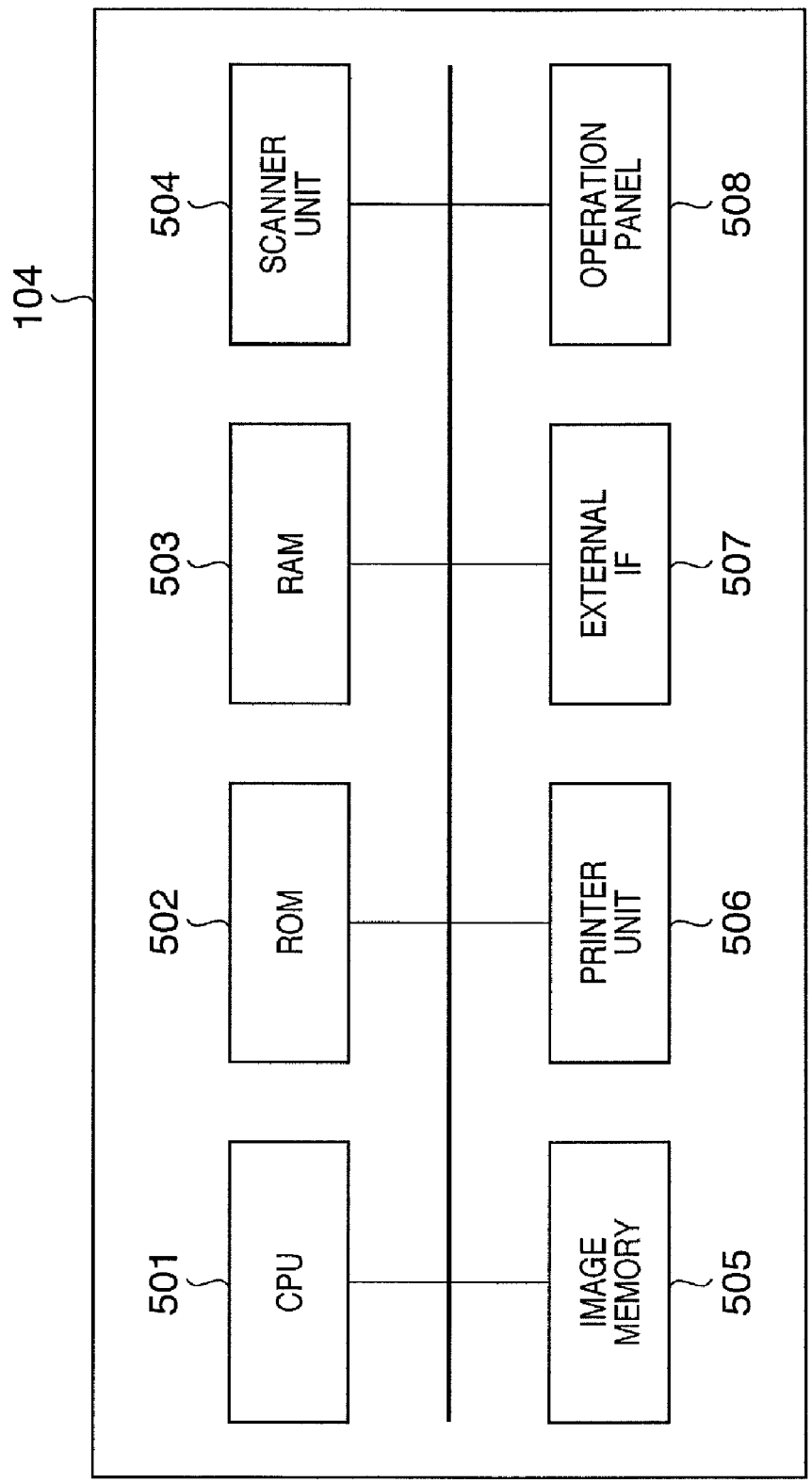
FIG. 5 is a block diagram showing an example of an information processing apparatus (image forming apparatus) according to an embodiment.

FIG. 5 is a block diagram showing an exemplary information processing apparatus (image forming apparatus) according to an embodiment. In FIG. 5, the CPU 501 is a control unit that centrally controls the units of the image forming apparatus 104 and performs various kinds of computations. A ROM 502 is a memory unit storing control programs. A RAM 503 is a memory unit used as a work area and a buffer for the CPU 501. A scanner unit 504 is a device that reads an image of an original. An image memory unit 505 is a memory device for storing image data of originals. A printer unit 506 is a printer engine that prints image data stored in the image memory unit 505 on a recording medium.

An external interface 507 is a communication interface that provides a connection to an external device through a network. For example, the external interface 507 receives print job data provided from the host computer 103. The CPU 501 converts print job data into a bitmap image to generate image data. The image data is JPEG or JBIG image data. The image data may be generated as a file. The generated image data is stored in the image memory unit 505. An operation panel 508 is an input/output device that presents information to a user or inputs a command from a user. For example, the operation panel 508 includes a touch panel sensor, a liquid-crystal display (LCD), and keys.

Figure 6:
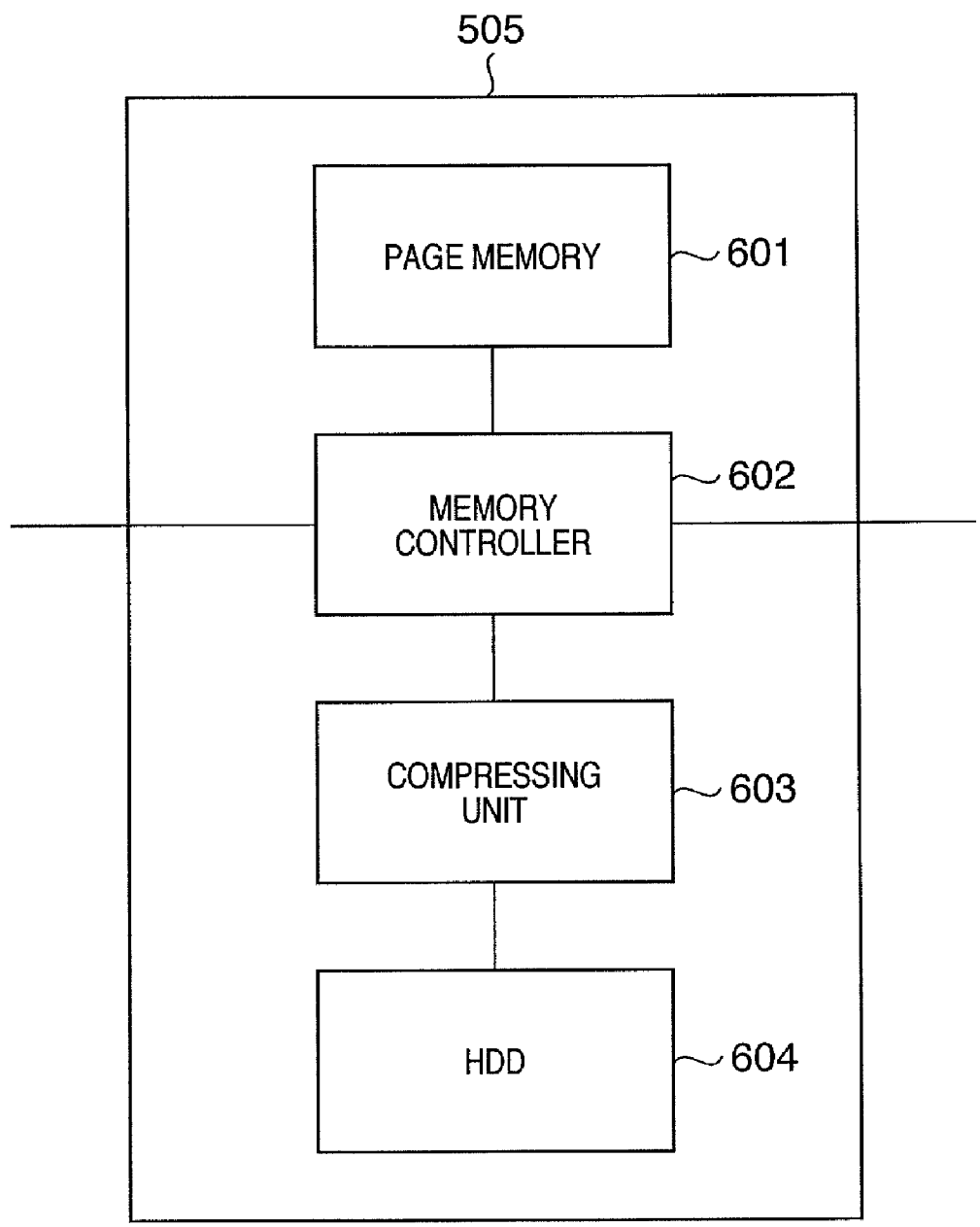
FIG. 6 is a block diagram showing an example of an image memory unit according to an embodiment.

FIG. 6 is a block diagram showing an exemplary image memory unit according to an embodiment. The image memory unit 505 includes a page memory 601, a memory controller 602, a compressing unit 603, and a hard disk drive (HDD) 604. The memory controller 602 writes image data sent from an external IF 507 or the scanner 504 into the page memory 601. The memory controller 602 reads image data from the page memory 601 and provides it to the printer unit 506. The memory controller 602 writes image data in a box provided in the hard disk drive 604 and reads image data from the box. The control by the memory controller 602 is performed according to instructions from the CPU 501.

Figure 7:
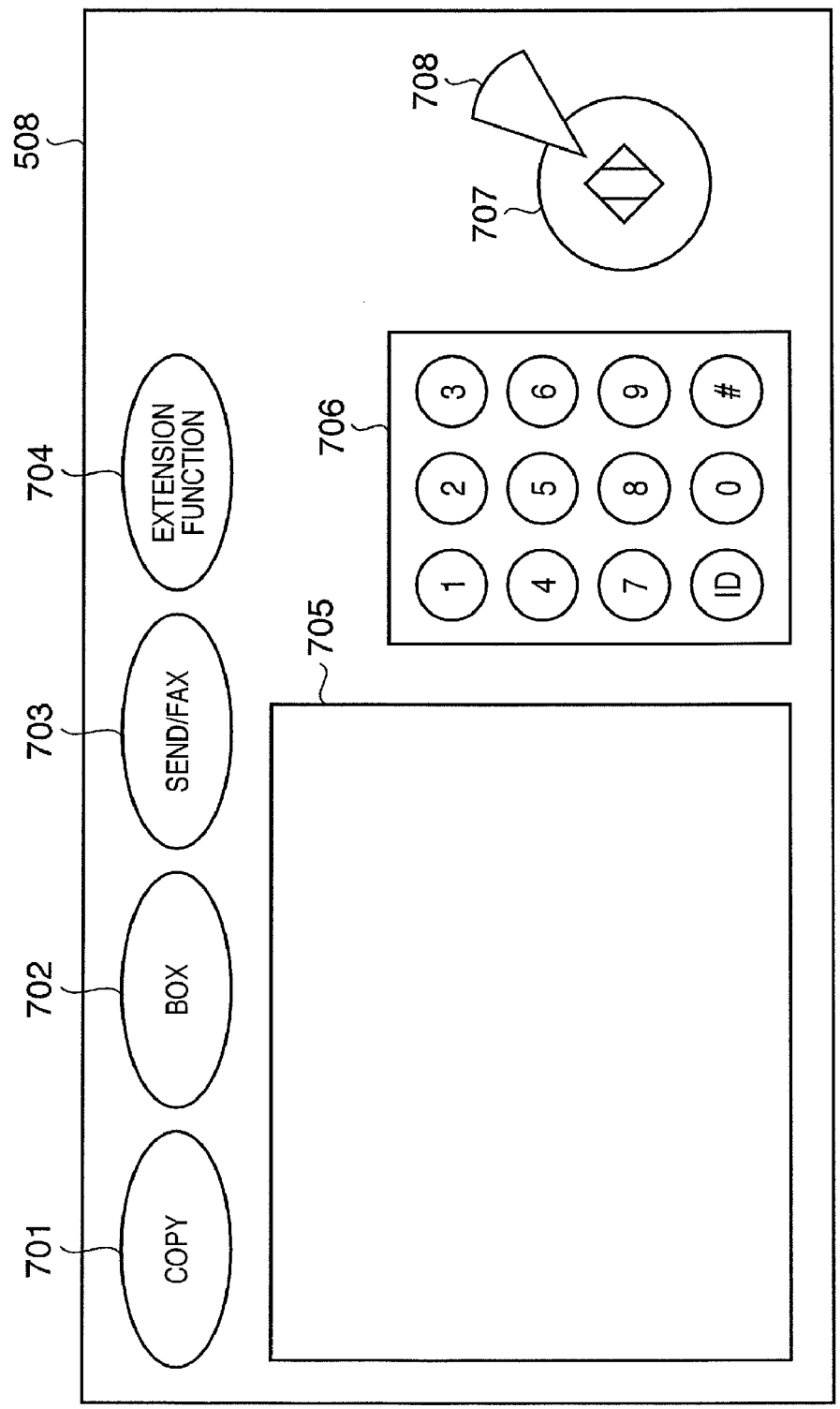
FIG. 7 shows an example of a user operation panel on the image forming apparatus according to an embodiment.

FIG. 7 shows an example of the operation panel of the image forming apparatus according to an embodiment. The operation panel 508 includes a copy function key 701, a box function key 702, a Send/FAX function key 703, an extension function key 704, a liquid-crystal-display with touch panel 705, a ten-key pad 706, a start key 707, and a stop key 708. When the copy function key 701 is depressed, the CPU 501 executes copy processing. When the box function key 702 is depressed, the CPU 501 invokes the box function. An electronic document (for example a document file or image file) is stored in the above-described box on a job-by-job basis. An electronic document stored in the box is referred to as a job document. A user can use the box function to read out a job document for printing or to delete a job document at any time.

The Send/FAX function key 703 is used to send data on an original or job document data to the host computer 103 or another apparatus. The extension function key 704 is used to perform an operation on print job data or a job document. The ten-key pad 706 is used for inputting numeric values. The start key 707 is used for instructing the apparatus to start copying or scanning The stop key 708 is used for instructing the apparatus to stop an operation.

Figure 8:
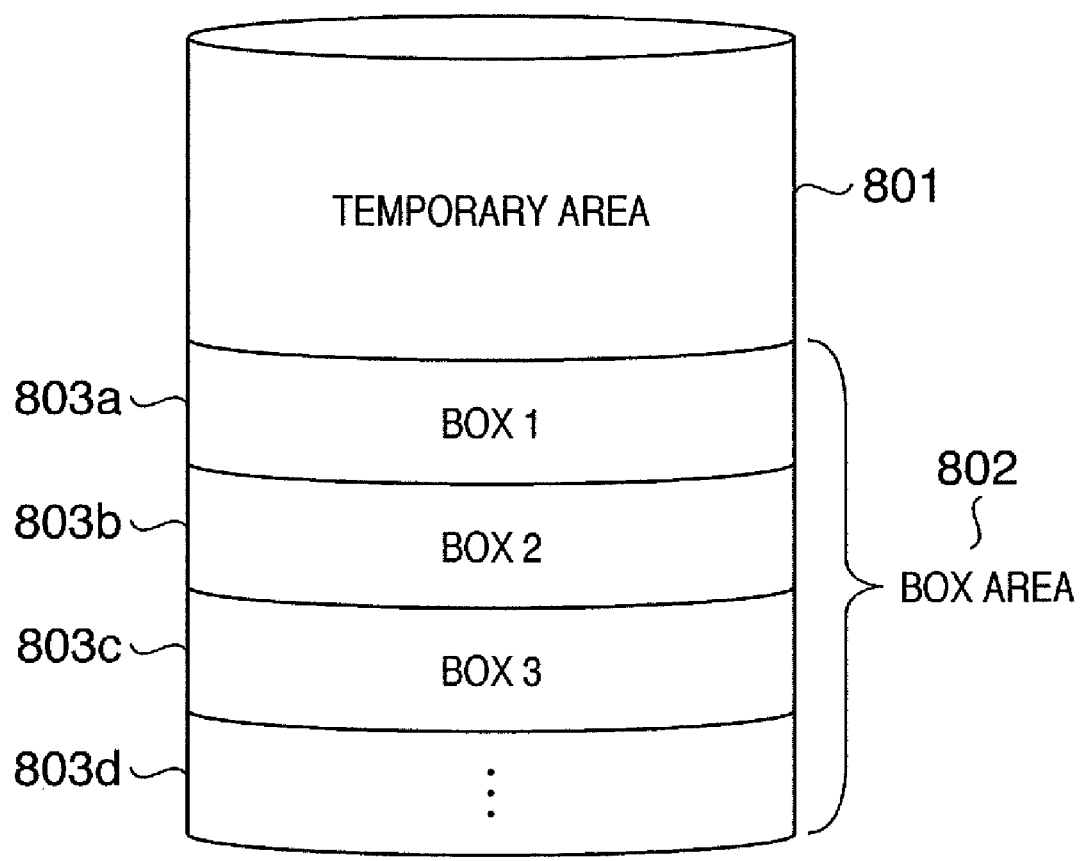
FIG. 8 is a diagram illustrating a box according to an embodiment.

FIG. 8 illustrates a box according to the embodiment. The HDD 604 includes a temporary area 801 and a box area 802. The temporary area 801 may be used for reordering the order in which image data is outputted or for printing multiple copies at one scanning operation. The temporary area 801 is also used for temporarily holding image data or an electronic document before it is stored in the box area 802 or for temporarily storing image data generated through conversion of print job data or image data obtained from the scanner. On completion of each operation, the image data stored in the temporary area 801 is automatically cleared.

The box area 802 is subdivided into small memory areas 803a-803d. These small memory areas are called boxes. Each of the boxes 803a-803d is assigned to an individual person or a section. An operator specifies beforehand a box into which image data is to be stored through the operation panel 508. The CPU 501 stores print job data and scan job data in the box specified by the operator.

Figure 9:
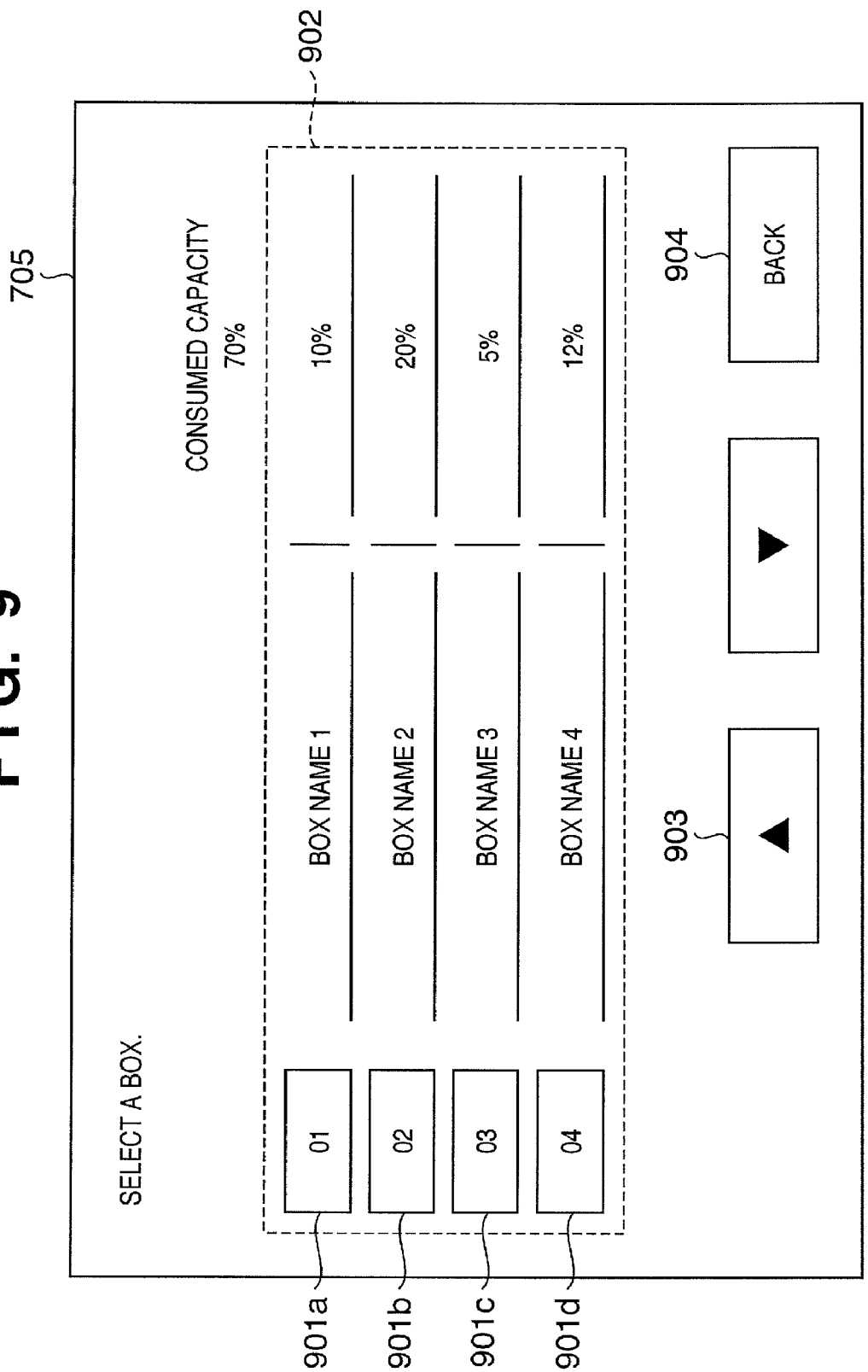
FIG. 9 shows an exemplary user interface of a box function according to an embodiment.

FIG. 9 shows an example of a user interface of the box function according to an embodiment. The example represents a basic screen displayed on the LCD 705 when the box function key 702 is depressed. The screen is presented for allowing a user to select a box to use. In a display area 902, box numbers 901a-901d, box names, and consumed capacities are displayed. The consumed capacity of a box represents the proportion, in percentage, of a used space of the box to the storage capacity of the entire box area. The scroll button 903 is used for scrolling up and down the screen to display multiple boxes. The Back key 609 is depressed to return to the initial screen.

Figure 10:
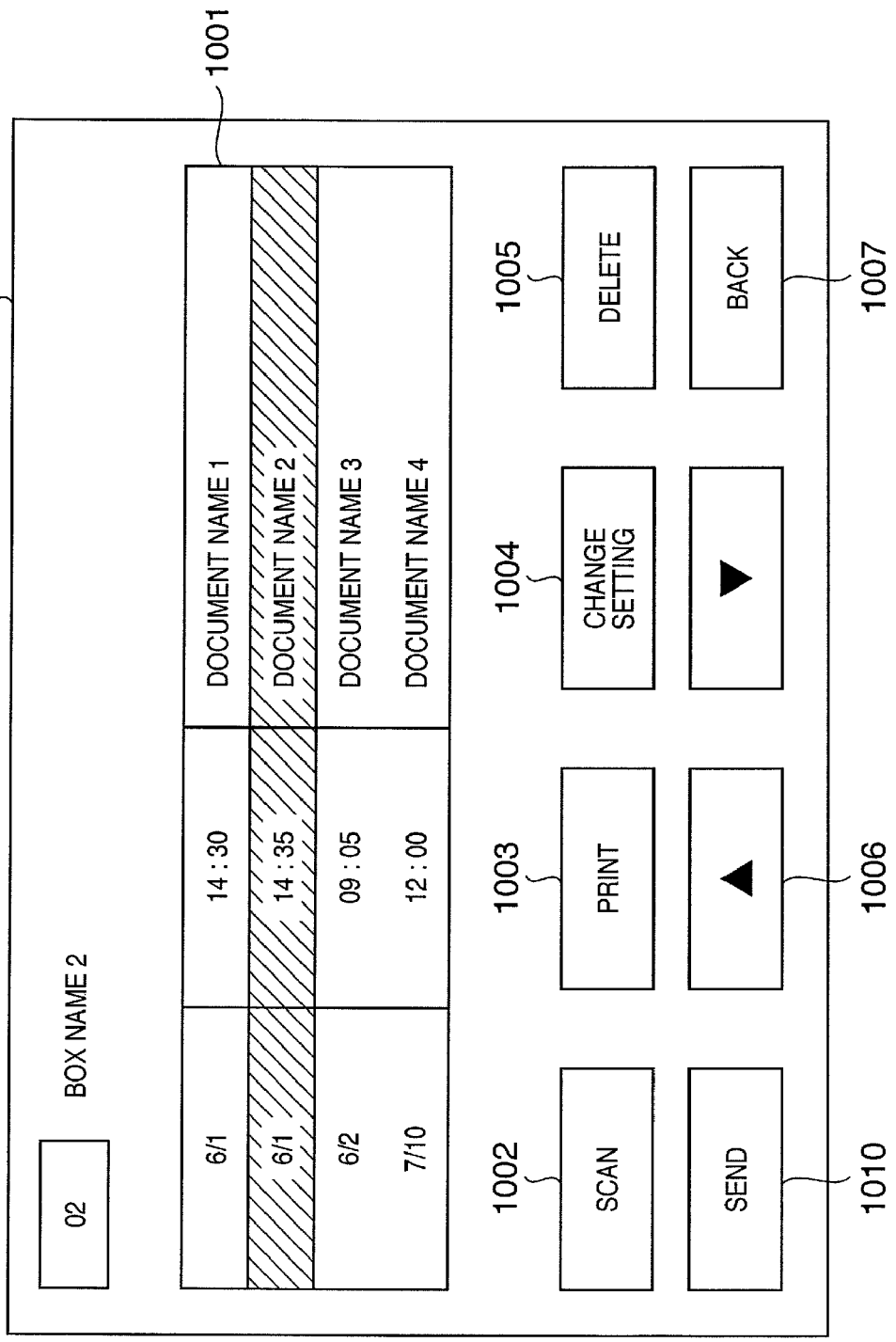
FIG. 10 shows another exemplary user interface of the box function according to an embodiment.

FIG. 10 shows an example of the user interface of the box function according to the embodiment. When one of the boxes in the screen shown in FIG. 9 is selected by an operator, the CPU 501 detects the selected box through the touch panel sensor. The CPU 501 then displays a screen as shown in FIG. 10 on the LCD 705.

Reference numeral 1001 indicates a list of job documents stored in the box. A storage data and time of each job document, a name of the job document or the like are listed. When the display area of any of the job documents is pressed, the CPU 501 highlights the row of the job document. For example, job document 2 is selected in FIG. 10.

When the scan key 1002 is depressed, the CPU 501 initiates scanning of an original and adds obtained image data to the selected box as a job document. When the print key 1003 is depressed, the CPU 501 initiates printing of a highlighted print job. When the setting change key 1004 is depressed, the CPU 501 changes a print setting relating to a selected job document. For example, addition or change of the number of copies to print or addition or change to print functions can be made.

When the delete key 1005 is depressed, the CPU 501 deletes a selected job document. The scroll up/down key 1006 is used for scrolling the screen. For example, the scroll up/down key 1006 is used when multiple documents stored in the box cannot be displayed on the LCD 705 at a time. The Back key 1007 is depressed to return to the screen shown in FIG. 9.

Figure 11:
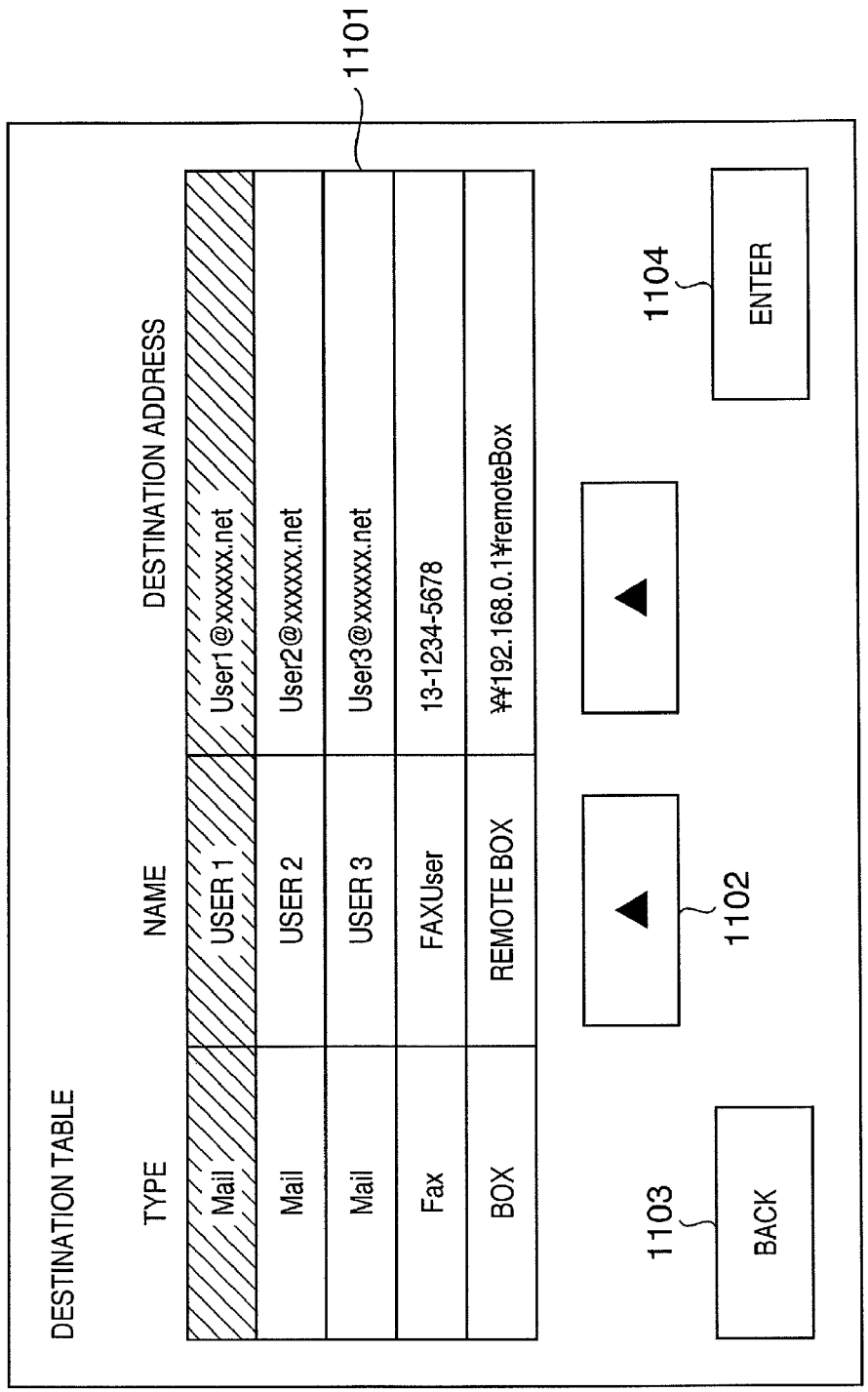
FIG. 11 shows an exemplary destination table according to an embodiment.

FIG. 11 shows an example of a destination table according to an embodiment. The destination table is displayed on the LCD 705 when the Send button 1010 is depressed. Reference numeral 1101 indicates information about destinations. The information 1101 includes the type of transmission method for each destination, the name of the destination, and destination information. The destination information may be an electronic mail address, a facsimile number, or a network address.

When a row on which the name of a destination is displayed is pressed, the CPU 501 highlights the row of the destination. For example, FIG. 11 shows that user 1 is selected. The scroll up/down key 1102 is used for scrolling the screen when destinations cannot be displayed at a time. Reference numeral 1103 denotes the Back key. When the Enter button 1104 is depressed, the CPU 501 sends a job document to the selected destination.

FIG. 12A shows an example of a document management table according to an embodiment. The management table is used for managing association between image data (document data) stored in a box and license information. The management table is stored in the hard disk drive 604, for example.

The document management table 1201 contains box numbers 1202, document names 1203, dates 1204, times 1205, document file names 1206, and license information file names 1207. The box number 1202 is an identifier uniquely identifying a document box. The document name 1203, date 1204, and time 1205 represent a document name, date, and time, respectively, displayed in FIG. 10. It is assumed here that image data and license information are stored in the box area.

If the license information 1207 column of a document is blank, it indicates that the image data is not associated with license information. That is, if image data contained in a document has license information, the image data is secure data for which an operation right is set. On the other hand, if image data contained in a document does not have license information, the image data can be manipulated by anyone at will.

FIG. 12B shows another exemplary document management table according to an embodiment. The document management table 1210 contains management information concerning image data in a device-specific format for the image forming apparatus 104. The device-specific format will be described later. In the document management table 1210, the box number column 1212, document name 1213, date 1214, time 1215, and document file name 1216 columns are the same as the box number 1202, document name 1203, date 1204, time 1205, document file name 1206, and license information file name 1207 columns in the document management table 1201. The passwords 1217 are passwords set for the documents in a box. The passwords are used as keys for encrypting and decrypting the documents in the box, if they are encrypted. If a document in a general format that is not specific to a device is generated by converting the device-specific format of the document and is stored in the box, information (a file name in this example) identifying the general-format data is set in the related general-format document column 1218. If a document in a general format is already contained in the box and a device-specific-format version of that document is generated, information indicating the document is also stored in the document management table 1210. The types of permitted operations are described in the attribute information column 1219 as information indicating rights to perform operations on device-specific format image data. For example, viewing and printing of the document with the document name 6 are the permitted operations on that document. More detailed operation right information, for example an operation right for each individual user, may be described in the attribute information column 1219.

<Method for Scanning a Paper Document to Generate an Encrypted Document and Storing the Document>

Figure 13:
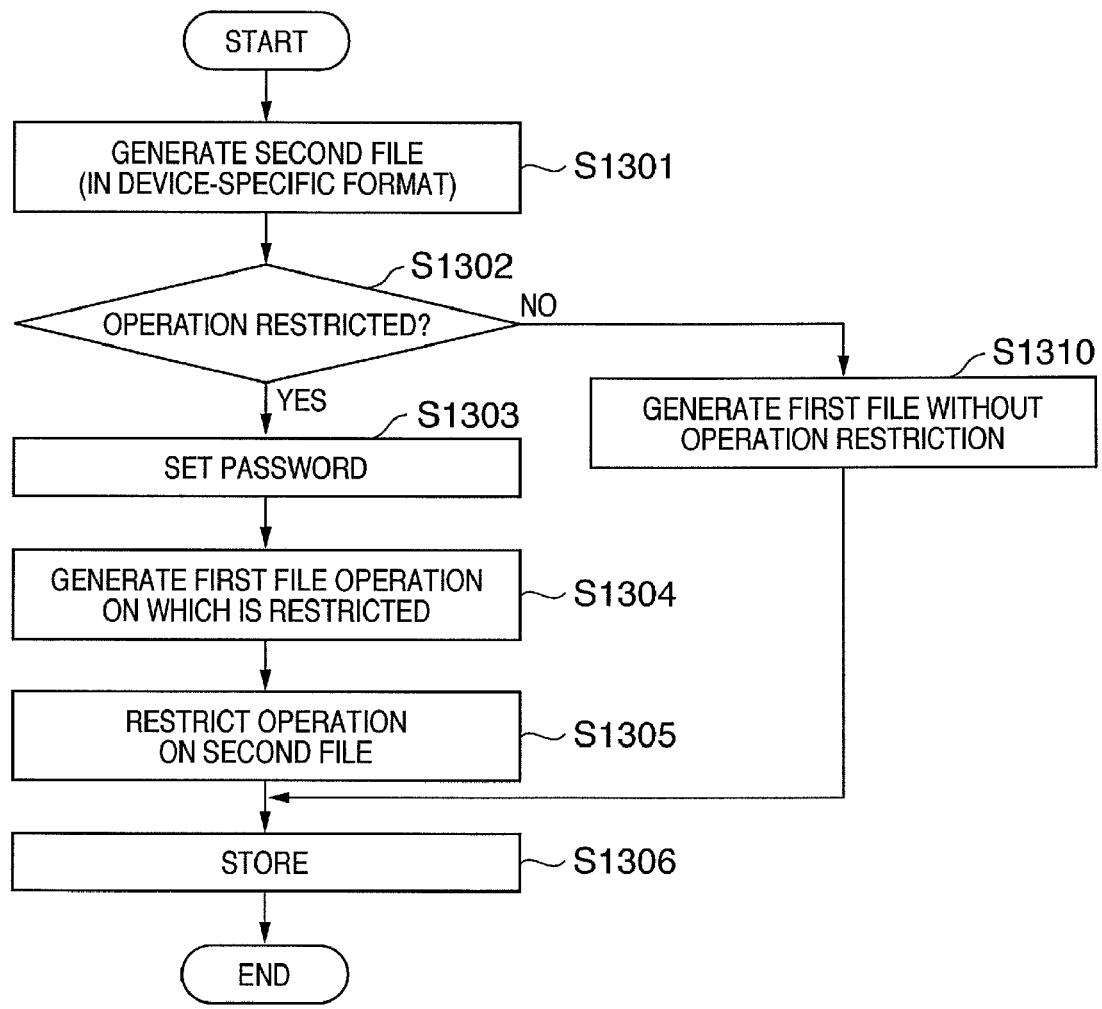
FIG. 13 is a flowchart illustrating an exemplary method for restricting a file operation according to an embodiment.

FIG. 13 is a flowchart illustrating an example of a file operation restricting method according to an embodiment. In this example, a general-format document file (document data, for example a PDF file) is generated from an original image file (image data) inputted through a scanner. That is, the document file is derived from the image file. The document file is encrypted in order to restrict operations on the file. Operations on the image file associated with the document file will also be restricted.

Prior to generate a PDF file (first file), the CPU 501 generates a second file from an original image at step S1301. The second file may be image data in a device-specific format (for example JPEG, JBIG or TIFF). In particular, the CPU 501 drives the scanner unit 504 to read an image on a paper original in response to a scan command provided from the operation panel 508. The read image is converted into image data or an image file in a device-specific format and stored in the image memory 505. The device-specific format may be a format that is suitable for being processed in the image forming apparatus (for example JPEG, JBIG, TIFF or any other unique format). Generating a general-format file as well as a device-specific-format image file from an original image file, the general-format file can be suitably handled at the destination when the image file is sent to an external device. On the other hand, if the image file is to be printed, a document file in a device-specific format may be used since it is suitable for the image forming apparatus to process and print it. In this way, a suitable format can be distinctly used according to a specific purpose.

At step S1302, the CPU 501 determines whether a restriction on a predetermined operation on the first file, which is a document file, is requested. For example, the CPU 501 may determine whether encryption of the first file is requested. This is because operations on the encrypted file can be restricted until the file is decrypted. It is assumed here that a request for encryption can be inputted through the operation panel 508 beforehand. If encryption is not requested, the process proceeds to step S1310, where the CPU 501 generates a document file having no operation restrictions.

On the other hand, if the restriction is requested, the process proceeds to step S1303, where the CPU 501 prompts the operator to enter a password through the operation panel 508. The password may be used as an encryption key. The CPU 501 then writes the password entered through the operation panel 508 in the RAM 503.

At step S1304, the CPU 501 converts the image file in a device-specific format into a document file in a general format. The CPU 501 then uses the entered password to encrypt the document file. This encryption restricts operations on the document file to the user who does not know the password.

At step S1305, the CPU 501 restricts the given operation on the second file. For example, the CPU 501 uses the password to encrypt the second file, which is an image file in a device-specific format. As a result, an encrypted image file is generated. Because the image file is related to the document file the given operation on which is restricted, the given operation on the image file is also restricted in this way.

The key used for encrypting the document file and the key used for encrypting the image file does not need to be the same. Also, the encryption algorithms applied to the files do not need to be the same. The requirement is that, if an operation on one file is restricted, the operation on the other related file should also be restricted.

For example, a password inputted by a user may be used as the key for generating an encrypted PDF file. Then encryption conforming to the specifications of Adobe Acrobat may be applied to the PDF file. To encrypt an image file in a device-specific format, at least one key registered in the image forming apparatus beforehand and a general-purpose algorithm (such as 3DES) may be used. These are illustrative only.

At step S1306, the CPU 501 associates and stores the generated document with a related image file in the HDD 604. The associated files may be grouped as a seemingly single document.

These files may be stored in a box described above, or in another storage area. If they are stored in a box, the CPU 501 updates the document management table 1201 with the files. Operations on the files are restricted by encryption, therefore the CPU 501 may generate license information described above and may store the generated license information also in the box. In the document management table 1210, the document with document name 9 is the management information concerning the document generated as a result of the process of the flowchart in FIG. 13. The device-specific-format document with document name 9 is "document_name9.jpg" and its general-format document is "document_name9.img". It can be seen that both versions are encrypted using the password "JJKKL" as the encryption key.

As described above, according to the present embodiment, if multiple related files are generated from a scanned original image and operations on one of the files are restricted, the operations on the other file or files are also restricted. In this way, a group of related files can be appropriately protected from information leakage.

In the example shown in FIG. 13, a password used for encryption is inputted through the operation panel 508. Alternatively, an IC card reader may be added as an integral part of the operation panel 508. In that case, the CPU 501 may read given information from an IC card inserted in the reader to generate an encryption key.

<Method for Restricting Operations on a Document Stored in the Image Forming Apparatus>

Figure 14:
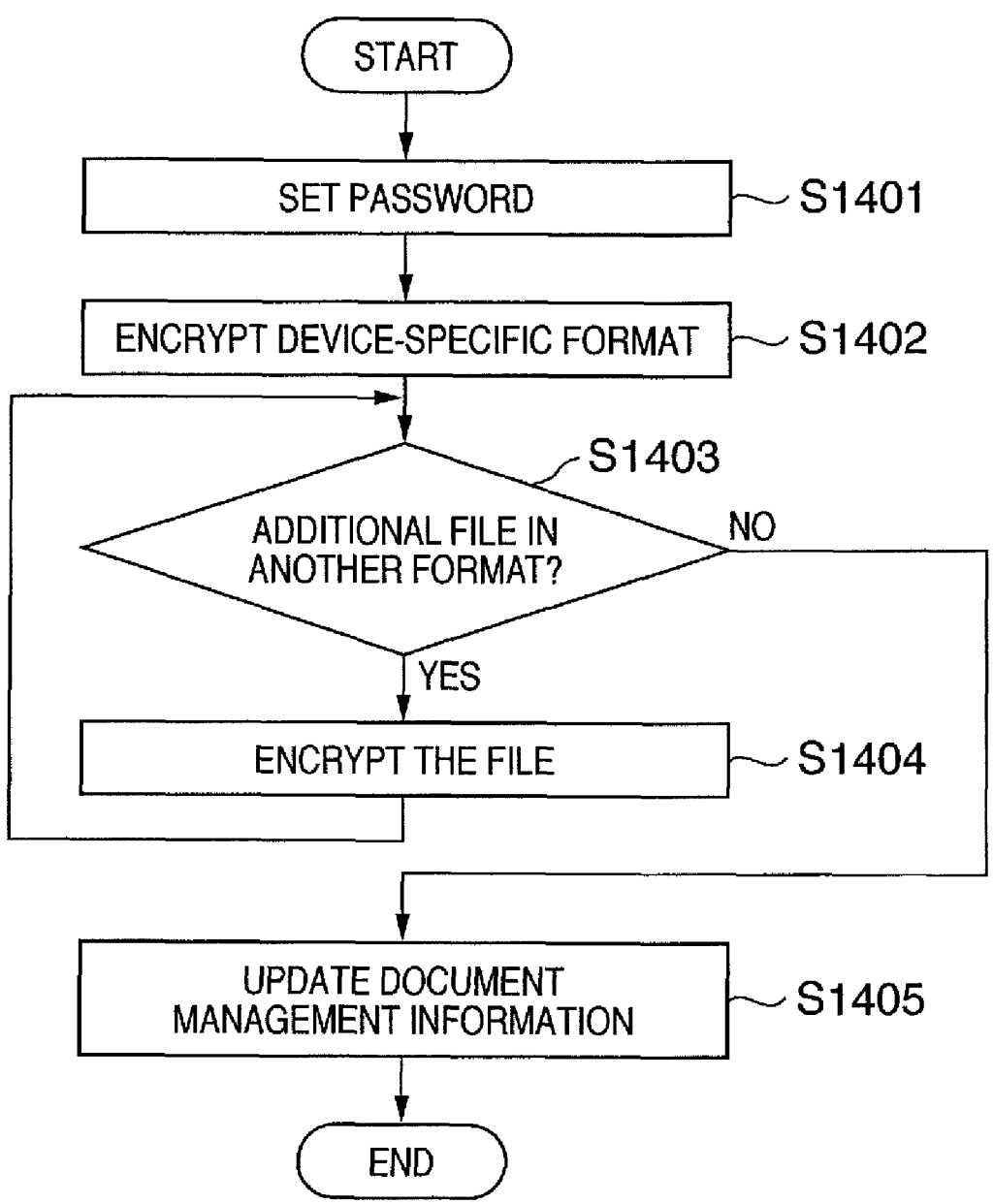
FIG. 14 is a flowchart illustrating another exemplary method for restricting a file operation according to an embodiment.

FIG. 14 is a flowchart illustrating another method for restricting file operations according to an embodiment. An exemplary method for restricting an operation on a document stored previously in a storage such as the HDD 604 of the image forming apparatus will be described below.

When an instruction to display a list of documents is inputted through the operation panel 508, the CPU 501 generates the list of documents based on document management information stored in the HDD 604 and displays the list, as shown in FIG. 10 for example, on the operation panel 508. The document management information allows the CPU 501 to identify one or more files managed as a single document. For example, the document management information is used to manage information such as the ID and title of a document, the names of files constituting the document and information indicating whether operation restrictions (for example encryption) is applied to the document. The document management information may be in the form of a document management tables 1201 and 1210 as described above or in any other form. The document management tables 1201 and 1210 shown in FIG. 12A, 12B are not designed to manage single documents. Therefore, a column containing document IDs and a column containing document titles may be added to the document management table 1201 and 1210.

When the CPU 501 detects that a document to be encrypted is selected from the list on the operation panel 508 and an instruction to encrypt the document is inputted, the CPU 501 executes the process in the flowchart.

At step S1401, the CPU 501 displays a message on the operation panel 508 to prompt the operator to input a password. The CPU 501 then writes the password inputted through the operation panel 508 in the RAM 503.

At step S1402, the CPU 501 reads a device-specific-format file associated with the selected document from the HDD 604 in the operation panel 508 and encrypts the file. The password inputted is used for the encryption.

At step S1403, the CPU 501 determines on the basis of the document management information whether there is an additional associated file in a different format. After encryption of all associate files is completed, the process proceeds to step S1405, where the CPU 501 updates the document management information concerning the encrypted files. That is, the CPU 501 changes information indicating whether these files are encrypted or not to information indicating that they are encrypted.

On the other hand, if an additional file is remained, the process proceeds to step S1404, where the CPU 501 encrypts the additional file as well. The encryption process is repeated until all files associated with the document to be encrypted are encrypted. It should be noted that after the completion of encryption, the encrypted original file is deleted from the HDD 604. Then, at step S1405, the CPU 501 updates the document management information on the encrypted files.

As has been described, according to this embodiment, operations on multiple related files previously stored in the image forming apparatus can also be restricted. That is, if a given operation on one file is restricted, the given operation on the other associated file or files will also be restricted.

<First Method for Setting a Policy for a Document Stored in the Image Forming Apparatus>

In the embodiment described above, operations on files are advantageously restricted through encryption. However, it is difficult to restrict different operations (such as display, edit, and print operations) on file by using encryption alone. In the example described below, a policy indicating a right to perform operations on a file is established to restrict the operations on the file.

Figure 15:
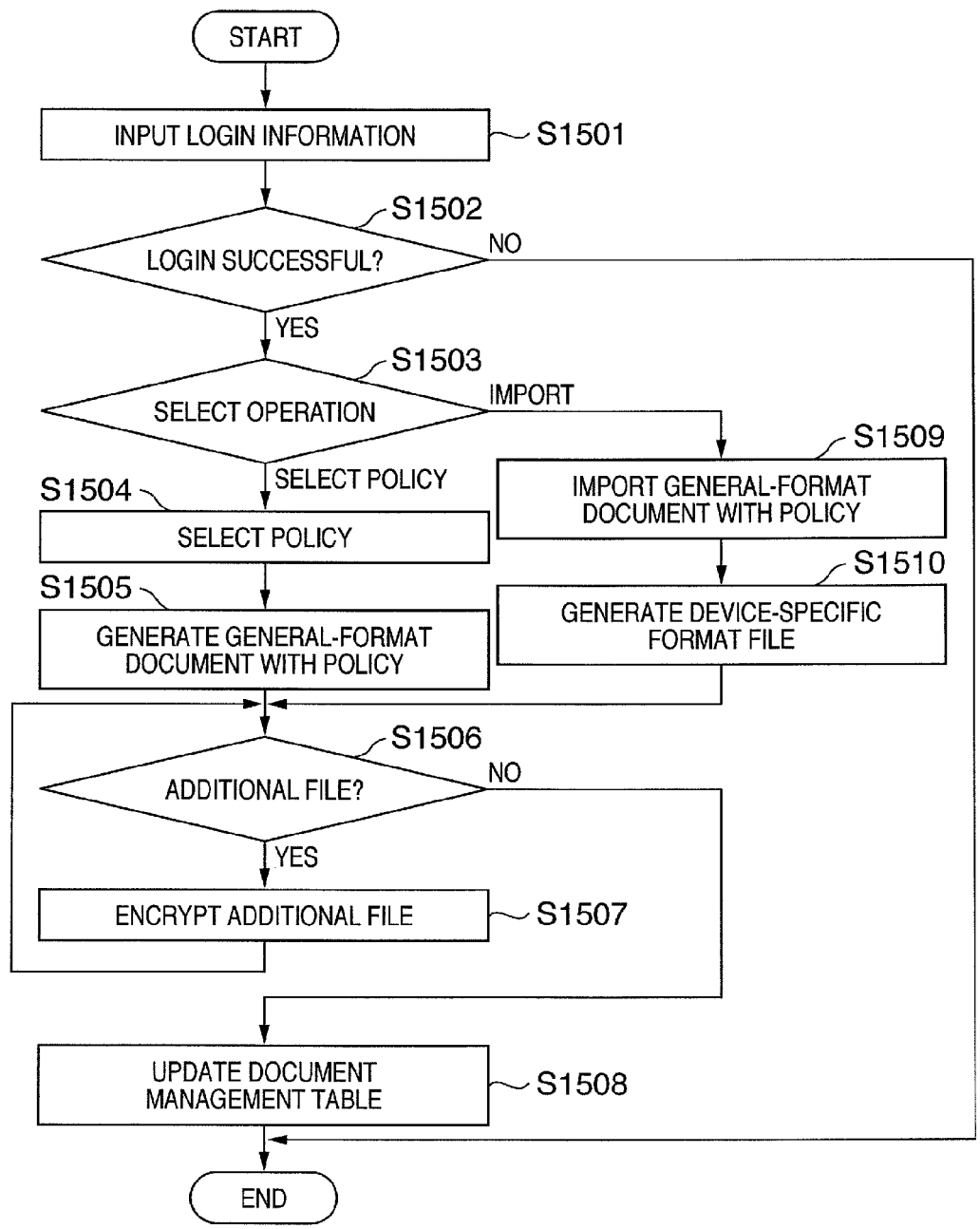
FIG. 15 is a flowchart illustrating yet another exemplary method for restricting a file operation according to another embodiment.

FIG. 15 is a flowchart illustrating another exemplary method for restricting file operations according to an embodiment. When the CPU 501 detects that any of documents listed on the operation panel 508 is selected (FIG. 10) and an instruction to set a policy is issued, the CPU 501 performs the following process. The instruction to set a policy may be issued by pressing the setting change button 1004, for example.

At step S1501, the CPU 501 performs a process for inputting login information into the directory server 101. For example, the CPU 501 displays a screen on the operation panel 508 to prompt the operator to input login information. The directory server 101 functions as a "policy server". A policy server is a server that manages a policy (file operation right) for each individual combination of a document ID and a user ID.

At step S1502, the CPU 501 determines whether the inputted login information is valid or not. For example, the CPU 501 sends an authentication request to the directory server 101 along with the login information. If a replay representing that the login information is valid is returned from the directory server 101, the CPU 501 determines that the login is successful and proceeds to step S1503. On the other hand, if the CPU 501 receives information indicating that the login information is invalid, the CPU 501 ends the policy setting process. Instead of the directory server 101, the user authentication server 102 mentioned earlier may perform the login processing. Authentication described below may also be performed by the user authentication server 102. At step S1503, one of "operation for selecting a policy" and "operation for importing a general-format document with policy" is selected according to an instruction from the user. If the operation for selecting a policy is selected, the process proceeds to step S1504.

At step S1504, the CPU 501 displays a screen on the operation panel 508 to allow the operator to select one of multiple policies to apply. These policies are managed by the directory server 101. The selection screen may be generated by the CPU 501 on the basis of information on policies sent from the directory server 101.

At step S1505, the CPU 501 generates a general document file (such as a PDF file) having the selected policy assigned to it. For example, the CPU 501 sends information identifying the selected policy to the directory server 101. The directory server 101 stores the document ID, the user ID, and the information identifying the selected policy in association with one another. Then, the CPU 501 adds license information received from the directory server 101 to the general-format document file. Thus, the policy is assigned to the document file. When a host computer 103 wants to perform an operation on the policy-assigned document file, the host computer 103 obtains operation right information associated with the combination of the document ID and the user ID from the directory server 101. Thus, operations on the document file can be appropriately restricted. Then, the process proceeds to step S1506. On the other hand, if the "operation for importing a general-format document with a policy" is selected at step S1503, the process proceeds to step S1509. At step S1509, the CPU 501 receives a general-format document file with a policy from a source external to the image forming apparatus 104 and stores it in a box. At step S1510, the CPU 501 generates image data in a device-specific format from the imported general-format document file. Then the process proceeds to step S1506.

At step S1506, the CPU 501 determines on the basis of the document management information whether there is an additional file in a different format that constitutes the selected document. If there is not such an additional file, the process proceeds to step S1508, where the CPU 501 updates the document management information to end the process. A file in a different format may be a non-PDF image file, image data in a device-specific format for example. It is assumed in this embodiment that policies can be applied to PDF files whereas policies cannot be assigned to files in other formats.

On the other hand, if there is an additional file, the process proceeds to step S1507, where the file in the different format is encrypted. The login information inputted during login to the directory server 101 may be used as the key for the encryption. Alternatively, the CPU 501 may request the operator to input information such as a password through the operation panel 508 as described above. Alternatively, the CPU 501 may use one or more keys stored in a storage such as the HDD 604. Alternatively, an IC card may be used as described above. Then, the CPU 501 updates the document management table at step S1507.

As has been described, according to this embodiment, operations on files can be appropriately restricted by assigning a policy or applying encryption to all files that are managed as a single document.

<Second Method for Setting a Policy for a Document Stored in a Device>

In the embodiment described above, a policy is assigned to document files such as PDF files to which a policy can be set and encryption is applied to other related files, thereby restricting operations on the files. In another embodiment, a protection attribute is assigned to related files to appropriately restrict operations on the files. In the following description, the same process steps that have been described above are labeled with the same reference numerals for simplicity.

Figure 16:
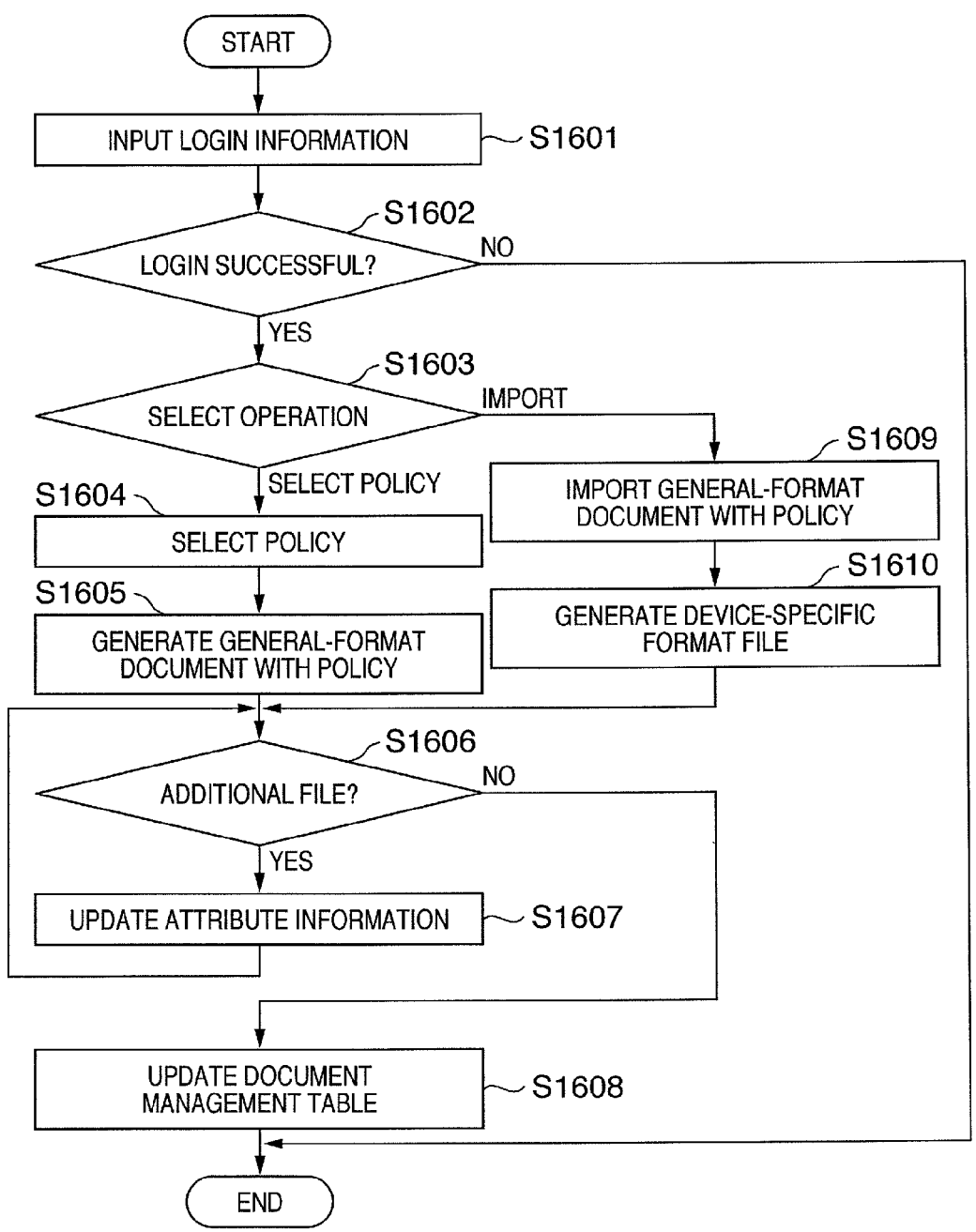
FIG. 16 is a flowchart illustrating yet another exemplary method for restricting a file operation according to an embodiment.

FIG. 16 is a flowchart illustrating a second method for restricting operations on files according to an embodiment. It can be seen from comparison of FIG. 16 with FIG. 15 that step 1507 shown in FIG. 15 is replaced with step S1607 in FIG. 16.

At step S1606, the CPU 501 updates attribute information in the document management table 1210 about a file in a different format. For example, the CPU 501 analyzes the type of a selected policy (for example, whether to allow display, edit, or print), generates attribute information of the same type as the policy, and assigns it to the files. Then, the CPU 501 proceeds to step S1508, where the CPU 501 updates the document management table so as to associate the document ID with the attribute information.

An example of the updated document management table will be described with reference to FIG. 12B. If a policy that provides view, print, and edit rights is assigned to the general-format document "document_name8.1 mg" in the document management table 1210, then information indicating the same rights is set in the attribute information column 1219 for its related device-specific-format document "document_name8.jpg".

As has been described, if a given operation on a document file is restricted, the CPU 501 obtains the type of the restriction and assigns an attribute equivalent to the obtained type to other related files. For example, if a PDF file with a policy is generated, attribute information that reflects the type of the policy is generated for other related files and is assigned to them. Thus, operations on multiple files managed as a single document can be appropriately restricted.

The image forming apparatus 104 can send a document ID, which is information identifying a file, to the directory server 101 to obtain the type of the policy assigned to that file. This is advantageous in that the type of operation restriction on a file can be changed by changing the type of policy in the policy database without altering the file itself. If an operation right for a general-format document file stored in a box on the image forming apparatus 104 is changed in the policy database of the directory server 101, the attribute information 1219 in the document management table 1210 is simply updated according to the change.

<Method for Outputting a Document Having an Assigned Policy>

Figure 17:
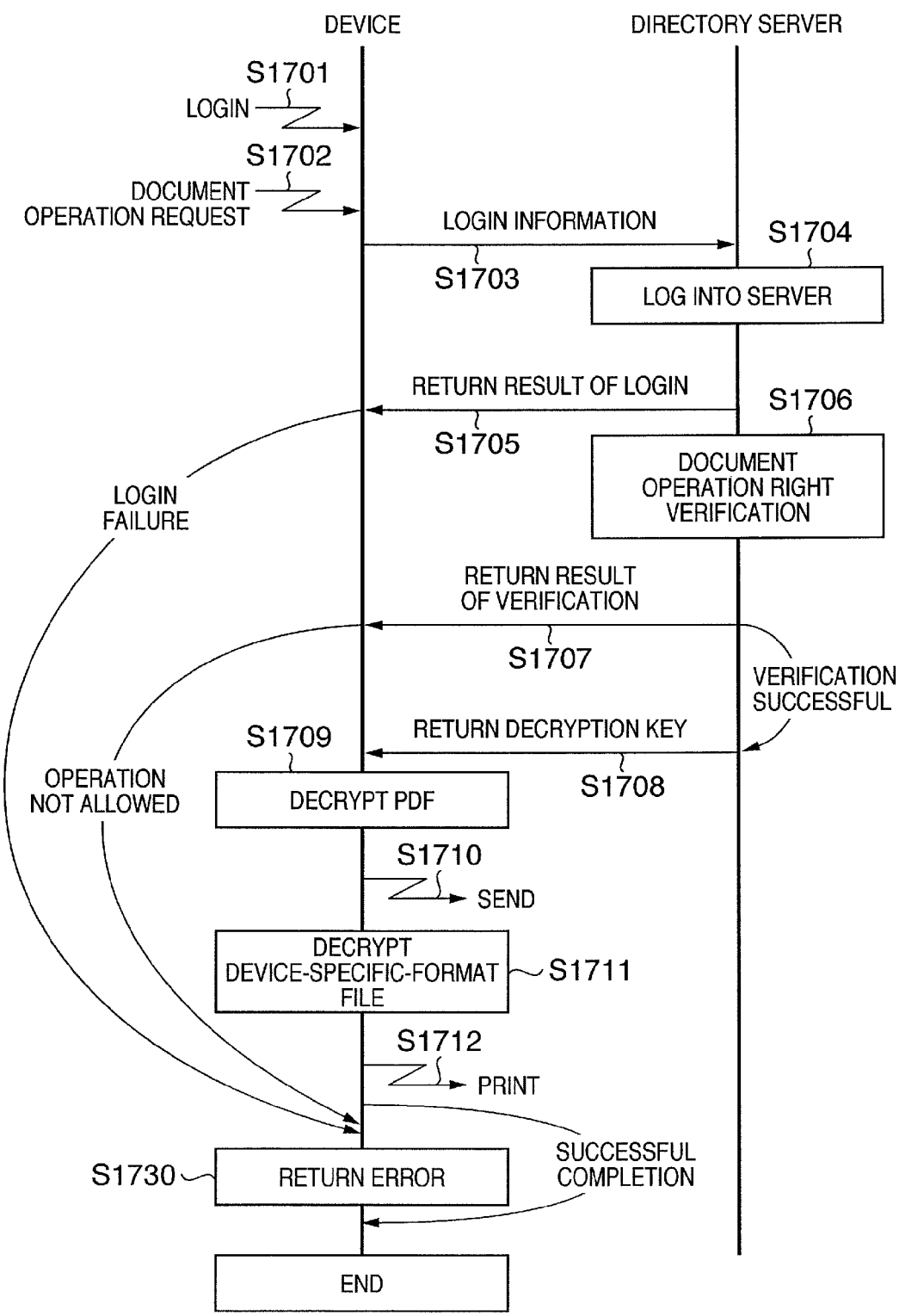
FIG. 17 is a sequence diagram illustrating an exemplary method for outputting a document to which a policy is assigned according to an embodiment.

FIG. 17 is a sequence diagram showing an exemplary method for outputting a policy-assigned document according to an embodiment. The device in FIG. 17 is a client device such as a host computer 103 or an image forming apparatus 104. The embodiment will be described with respect to an image forming apparatus 104.

At step S1701, the CPU 508 performs a login processing to the image forming apparatus 104 made by an operator through the operation panel 508. The login processing may be authentication using an IC card. At step S1701, the CPU 501 detects the login request for a document stored in the HDD 604 through the operation panel 508.

At step S1703, the CPU 501 sends the operator's login information to the directory server 101. The login information has been inputted through the operation panel 508. In an environment in which a single-sign-on service is enabled, the login information to the image forming apparatus 104 may be directly applied to the login to the directory server 101. The single sign-on service is a service that omits authentication of a user in a network once authentication of the user in another network is successful.

At step S1704, the CPU 401 of the directory server 101 determines whether the received login information is valid. At step S1705, the CPU 401 sends the result of the login processing to the image forming apparatus 104. If the login fails, the process proceeds to step S1730, where the CPU 501 of the image forming apparatus 104 displays an error message on the operation panel 508 and then ends the process.

On the other hand, if the login is successful, the CPU 401 of the directory server 104 verifies whether the operator who logged in has a right to output the document at step S1706. For example, the CPU 401 searches a policy database for the right on the basis of the document ID and user ID received from the image forming apparatus 104. In the policy database (FIG. 2), document IDs and user IDs (user names) are stored in association with operation right information. At step S1707, the CPU 401 sends the operation right information extracted from the database to the image forming apparatus 104 as notification of the result of the verification.

If the notification of the received verification result indicates that operations on the document is inhibited, then the CPU 501 of the image forming apparatus 104 ends the process by displaying an error message on the operation panel 508 (S1730).

On the other hand, if the verification result is successful (the operator has the operation right), the CPU 401 of the directory server 101 sends a key for decryption to the image forming apparatus at step S1708. The decryption key has been sent from the image forming apparatus 104 to the directory server 101 and registered in the policy database beforehand.

At step S1709, the CPU 501 of the image forming apparatus 104 uses the key it received to decrypt the PDF file. If transmission of the document is requested, the CPU 501 attaches the decrypted PDF file to an email and sends it to another device at step S1710. The document may be sent to another facsimile machine. If the operator wants to send the document with its confidentiality being ensured, the CPU 501 sends the PDF file with the policy which remains to be encrypted.

On the other hand, print of the document is requested, the CPU 501 decrypts the device-specific-format image file at step S1711. It is assumed here that the CPU 501 has received from the directory server 101 information indicating that the operator has a print right. At step S1712, the CPU 501 sends the decrypted image file to the printer unit 506 for printing. It should be noted that the PDF file does not need to be decrypted.

The key used for decrypting a device-specific-format file is dependent on the encryption. For example, if a key received from the directory server 101 may be used. Alternatively, a key registered in the image forming apparatus 104 may be used. A different key may be used for decrypting a non-PDF file. Furthermore, a password set by the user may be used as the decryption key.

As has been described, according to this embodiment, multiple files managed as a single document are decrypted and outputted in accordance with the output target. If a file is to be sent to a device as an email attachment, the file can be sent without being decrypted, thereby ensuring the confidentiality of the file. If printing is to be performed, only an image file for printing is decrypted without decrypting the PDF file so that the printing can be efficiently performed.

<Method for Previewing a Document>

The above embodiment has been described with respect to transmission and printing operations as an example of output processing. A preview process will be described next. If preview is performed in cooperation with the directory server 101, the process shown in FIG. 17 can be employed with little modification. That is, the CPU 501 decrypts a file in a device-specific format according to the procedure described with respect to FIG. 17, and then generates a preview image and displays it on the operation panel 508. It should be noted that for previewing, the preview image is generated from the related device-specific-format image data, instead of the general-format document file.

Figure 18:
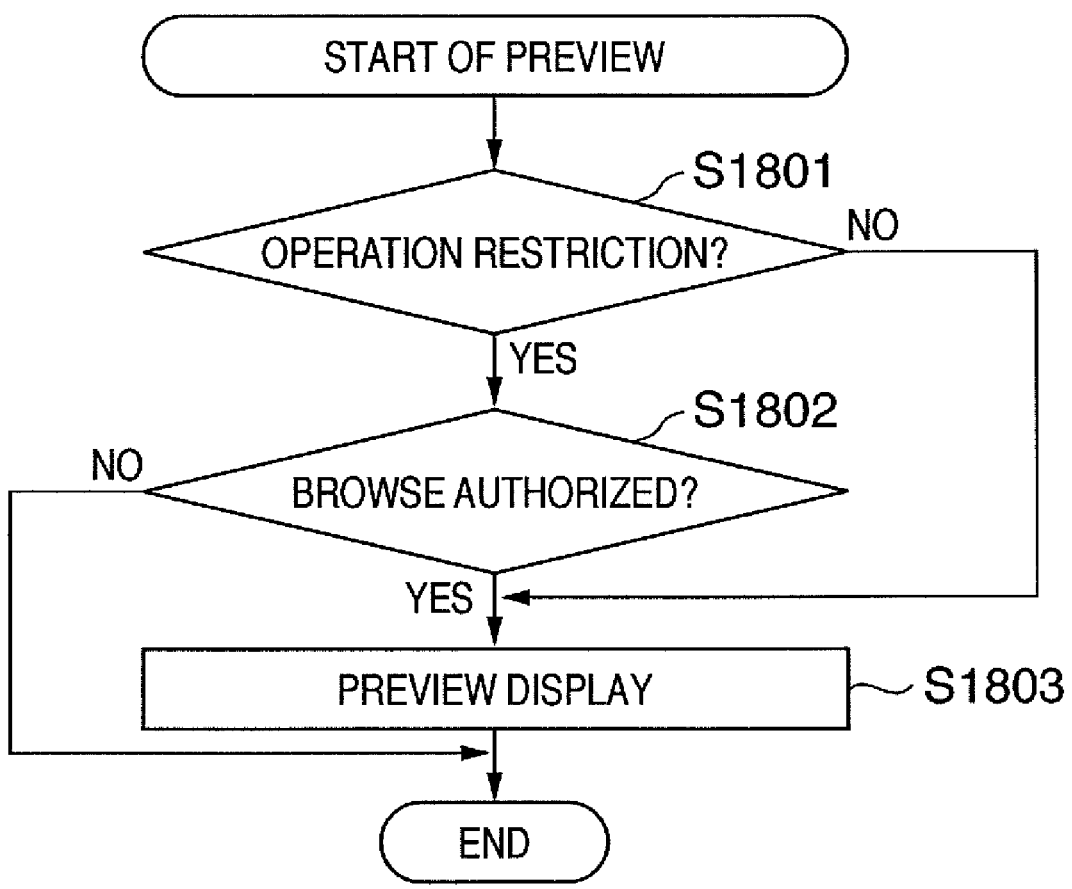
FIG. 18 is a flowchart illustrating an example of an output process according to an embodiment.

FIG. 18 is a flowchart illustrating an exemplary output process according to an embodiment. With reference to the flowchart, a process for previewing an encrypted document without involvement by the directory server 101 will be described.

At step S1801, the CPU 501 determines whether a document for which a preview request is issued through the operation panel 508 is encrypted for restricting operations on it. For example, the CPU 501 refers to document management table using the ID of the document to determine whether an operation on the document is restricted. If it is an unencrypted document on which no operation restriction is placed, the process proceeds to step S1803, where the CPU 501 generates a preview image from the device-specific-format file and displays it on the operation panel 508.

On the other hand, if it is a document on which an operation restriction is placed, the process proceeds to step S1802, where the CPU 501 determines whether the operator has a browse right. For example, the CPU 501 may prompt the operator to input authentication information (such as a password established when the document was encrypted) through the operation panel. The CPU 501 then verifies that the input authentication information is valid.

If the authentication information is invalid, the CPU 501 displays an error message on the operation panel 508 and ends the process without presenting a preview display. On the other hand, if the authentication information is valid, the process proceeds to step S1803. The CPU 501 decrypts the device-specific-format file on the basis of the authentication information and generates a preview image. The CPU 501 then displays the preview image on the operation panel 508.

As has been described, according to this embodiment, preview processing can be appropriately performed in cooperation with the directory server 101. Furthermore, preview processing can be appropriately performed in accordance with document management information held by the image forming apparatus 104 without involvement by the directory server 101.

<Method for Prohibiting Listing of Thumbnails of Documents Including Secure Documents>

The confidentiality of PDF files can be ensured by assigning policies to them in conventional ways. However, it is difficult to ensure the confidentiality of files in a device-specific format held in an image forming apparatus. For example, if a thumbnail image of the content of a document is generated and displayed from a file in a device-specific format, the document can be viewed. A method for appropriately ensuring the confidentiality of documents by protecting them from being listed as thumbnail images will be described below.

Figure 19:
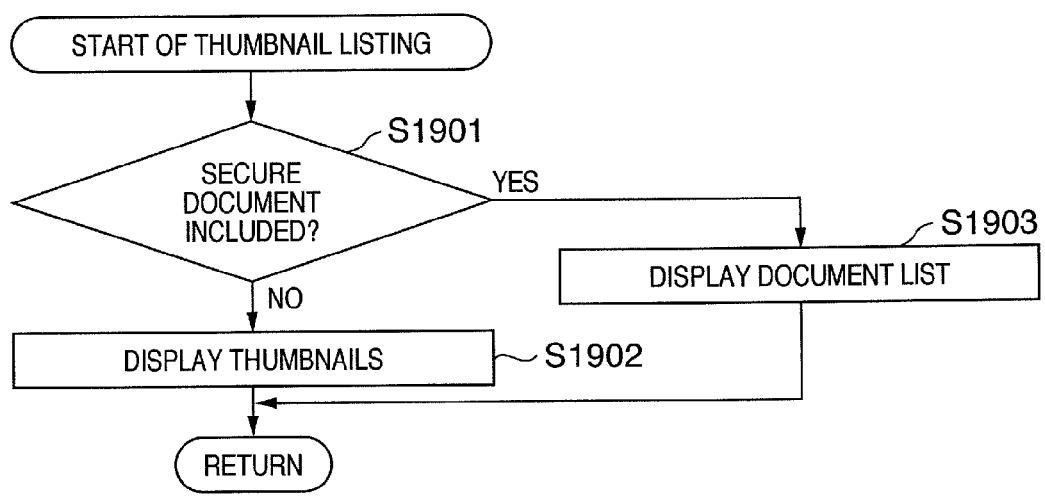
FIG. 19 is a flowchart illustrating an exemplary thumbnail listing process according to an embodiment.

FIG. 19 is a flowchart illustrating an example of a thumbnail displaying process according to an embodiment. According to this embodiment, if any of stored documents is a secure document, thumbnail listing of the documents is prohibited to protect the security of that document. The term "secure document" as used herein refers to a document on which operations are restricted according to this embodiment. The process in the flowchart starts when an instruction to list documents is issued through the operation panel 508.

At step S1901, the CPU 501 determines on the basis of document management information whether one or more secure documents are stored in the HDD 604. If no secure documents are stored, the process proceeds to step S1902, where the CPU 501 generates thumbnail images of the stored documents and lists of the thumbnails the documents. On the other hand, if at least one of the stored documents is a secure document, the process proceeds to step S1903, where the CPU 501 generates a list of the names of the stored documents and displays it on the operation panel 508.

According to this embodiment, whenever stored documents include a secure document, the documents are listed by document name forcibly, thereby ensuring the confidentiality of the documents.

<Method for Listing Documents Including Secure Documents as Thumbnails>

According to the method described with respect to FIG. 19, thumbnail listing of all stored documents is restricted if the documents include at least one secure document. That is, thumbnail listing of documents on which operation restrictions are not placed is also prohibited. This can impair the flexibility of listing. A method for prohibiting thumbnail listing of only documents the browse of which is prohibited will be described below.

Figure 20:
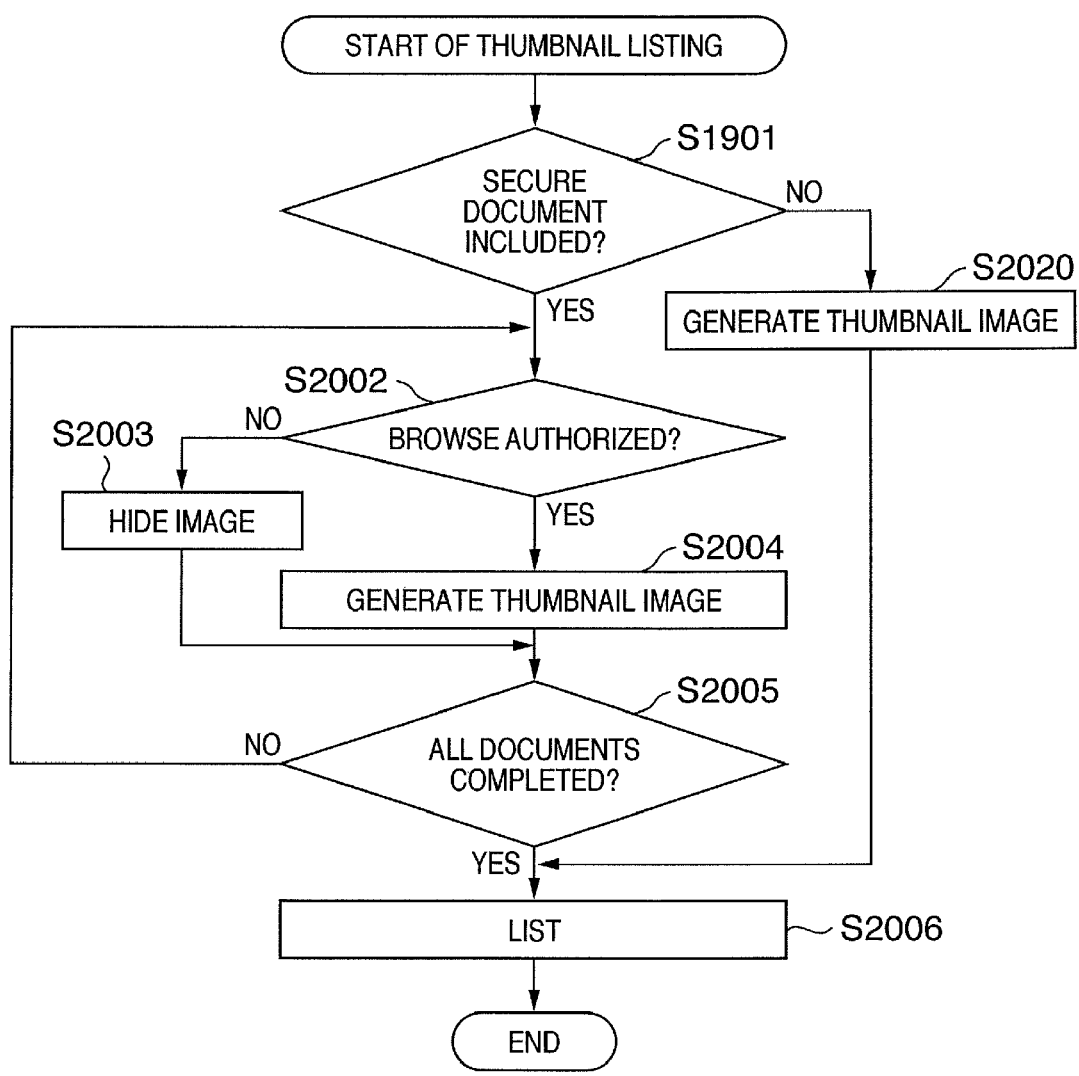
FIG. 20 is a flowchart illustrating another exemplary thumbnail listing process according to an embodiment.

FIG. 20 is a flowchart illustrating another example of a thumbnail listing process according to an embodiment. The steps already described are labeled with the same reference numerals used above for simplicity.

If no secure document is included, the process proceeds to step S2020, where the CPU 501 generates thumbnail images. At step S2006, the CPU 501 uses the thumbnail images to list the documents on the operation panel 508.

On the other hand, if one or more secure documents are included, the process proceeds to step S2002. At step S2002, the CPU 501 determines whether the operator has a browse right for documents of interest. The determination as to whether the operator has a browse right may be made on the basis of document management information. For example, the CPU 501 may display a screen for inputting authentication information on the operation panel 508. The CPU 501 then may determine whether inputted authentication information matches authentication information registered in the document management information. Alternatively, the CPU 501 may use inputted authentication information as a decryption key to determine whether the operator has a browse right. Of course, the CPU 501 may inquire of the directory server 101 as described above. Alternatively, a single sign-on service may be used.

If the operator has a browse right, the process proceeds to step S2004, where the CPU 501 generates thumbnail images of the documents of interest. On the other hand, if the operator does not have a browse right, the process proceeds to step S2003, where the CPU 501 excludes the secure document from the listing.

At step S2005, the CPU 501 determines whether the thumbnail generation (steps S2002-S2004) for all of the stored documents is completed. If not, the process returns to step S2002 for performing the process for the next document. At step S2006, the CPU 501 lists only documents for which the operator has the browse right.

As has been described above, according to this embodiment, documents for which an operator has a browse right is listed so that the operator can visually check those documents. Documents for which the operator does not have the browse right is excluded from the listing so that the operator cannot known even the existence of the documents. Thus, the confidentiality of documents can be ensured.

The embodiment has been described with respect to thumbnail image listing. However, the present invention is not limited to this. Listing in any other form such as document name listing may also be used.

It should be noted that thumbnail image files may be generated beforehand and managed as a single document. This can conveniently eliminate the operation for generating thumbnail images each time the documents are to be listed.

<Storing Files from Host Computer to a Box>

A process for the host computer 103 to store an electronic document in a box in the image forming apparatus 104 will be described below.

Figure 21:
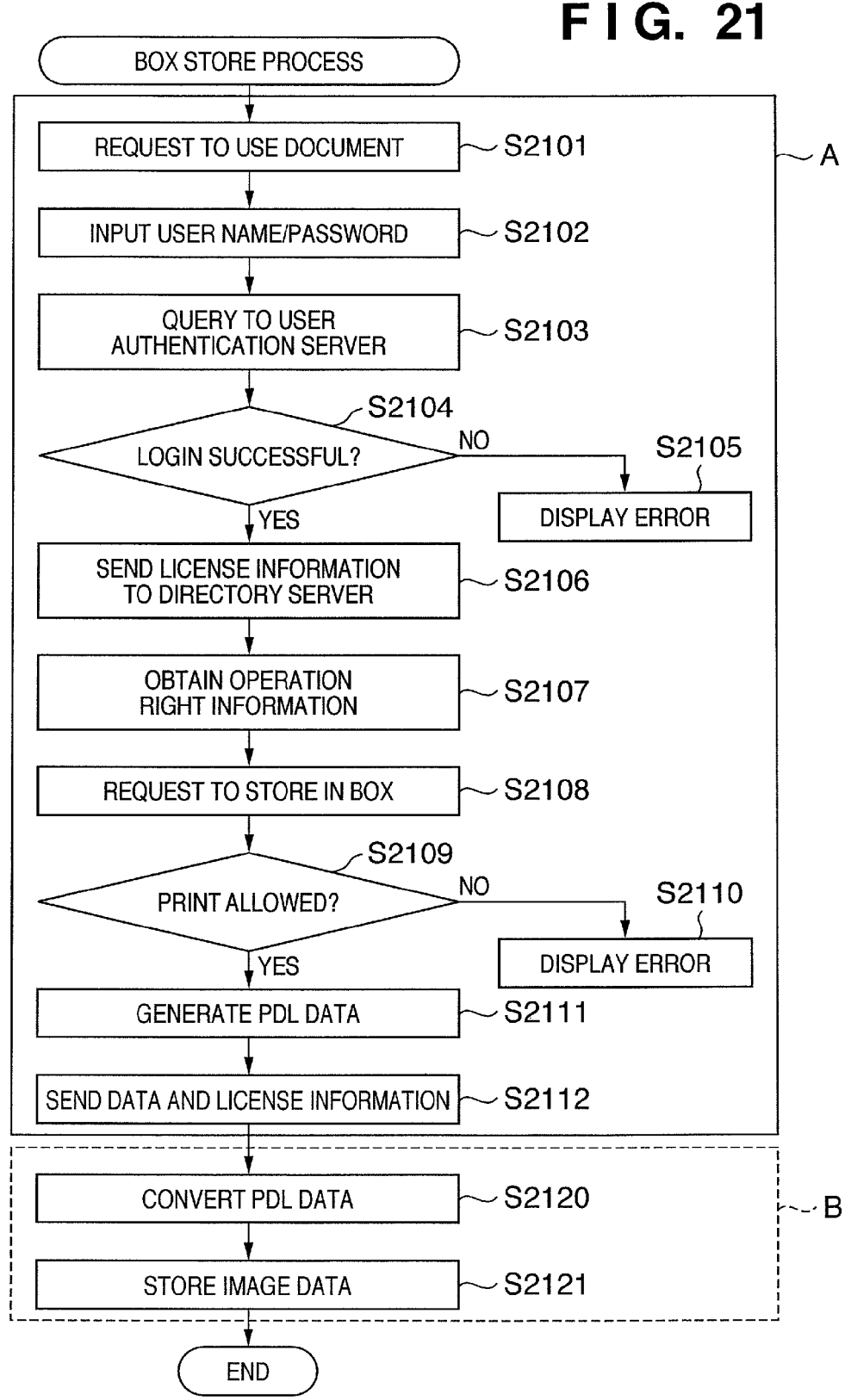
FIG. 21 is a flowchart illustrating a process for storing a file in a box according to an embodiment.

FIG. 21 is a flowchart illustrating a process for storing a file in a box according to an embodiment. Frame A in FIG. 21 indicates steps performed by the host computer 103. Frame B indicates steps performed by the image forming apparatus 104.

At step S2101, the CPU 401 of the host computer 103 receives a request for using an electronic document through the user operation unit 406. At step S2102, the CPU 401 displays a screen for logging into the directory sever 101 on the display device 405. The CPU 401 receives an input of a user name and password through the user operation unit 406.

At step S2103, the CPU 401 sends the inputted authentication information to the user authentication server 102 to inquire of the server 102 about the validity of the user. At step S2104, the CPU 401 determines whether the user login is successful. For example, if the user authentication server 102 successfully verifies the validity of the authentication information, the CPU 401 determines that the login is successful. If the login fails, the process proceeds to step S2105, where the CPU 401 displays an error message on the display device 405 indicating that the user cannot log in.

On the other hand, if the login is successful, the process proceeds to step S2106, where the CPU 401 sends license information (FIG. 3) associated with the document file, and user name information to the directory server 101. When the CPU 401 of the directory server 101 receives the license and user name information, the CPU 401 of the directory server 101 reads information about a right to perform operations on the file (restriction information) from a policy database (FIG. 2) and sends it to the host computer 103. At step S2107, the CPU 401 of the host computer 103 receives the operation right information.

At step S2108, the CPU 401 of the host computer 103 receives a request for storing the electronic information in a box in the image forming apparatus 104 from the user operation unit 406. At step S2109, the CPU 401 determines from the operation right information it obtained whether the user has a print right.

The operation for storing the document in a box is similar to an operation in ordinary print processing. In either operation, print job data (for example PDL data) is sent from the host computer 103 to the image forming apparatus 104. However, if the operator does not have a right to print the electronic document of interest, the document cannot be printed and therefore it is not stored in a box.

If the operator of the host computer 103 does not have a print right, the process proceeds to step S2110, where the CPU 401 displays an error message on the display device 405 indicating that the operator does not have the right. On the other hand, if the operator has a print right, the process proceeds to step S2111, where the CPU 401 generates print job data from the electronic document. The process then proceeds to step S2112, where the CPU 401 sends the license information associated with the electronic document to the image forming apparatus 104 along with the print job data.

When the CPU 401 of the image forming apparatus 104 recognizes the received print job as a job to be stored in the box, the CPU converts the print job data into image data at step S2120. For example, the CPU 401 may bitmap the PDL data to generate an image data file (image file). The device-specific format described above is applied to the image file. The CPU 501 then records an association between the image file and license information in a document management table 1201. The CPU 501 also stores the image file and license information in a document box. A general-format document file such as PDF may also be generated along with the device-specific-format file at step S2120.

At step S2121, the CPU 401 adds the received license information to the image file and stores it in the box. If there are multiple boxes, any of the boxes may be specified from the host computer 103. The device-specific-format image data is associated with license information and managed in the document management table 1201 shown in FIG. 12.

As has been described, according to this embodiment, a secure electronic document on which operations are restricted can be appropriately stored in a box in the image forming apparatus 104 from the host computer 103. Of course, this embodiment has the advantage that operation restrictions equivalent to those on the original secure electronic document can be applied to a print job document (print image file) derived from the secure electronic document.

<Printing Processing of an Image File Stored in a Box>

Figure 22:
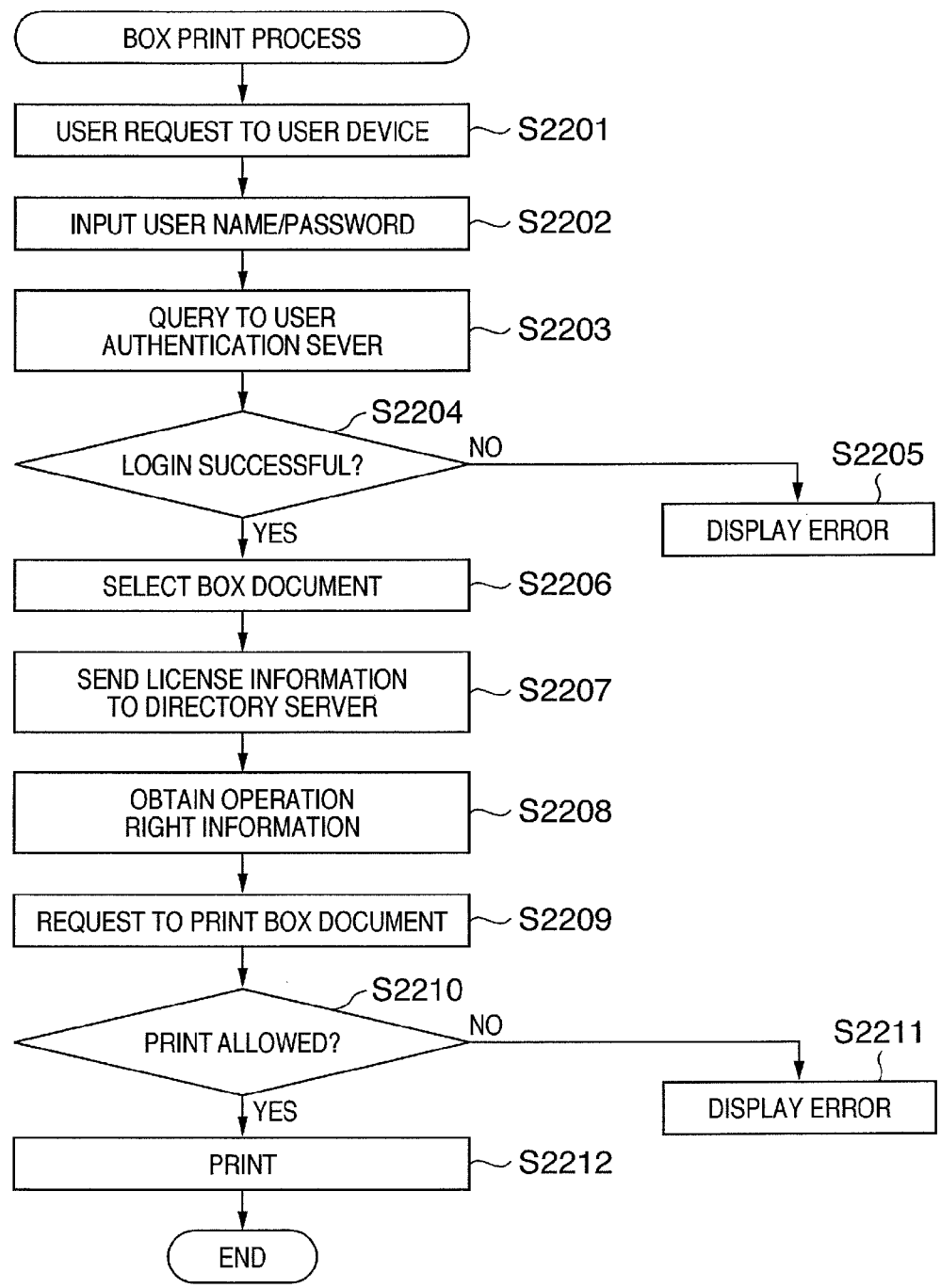
FIG. 22 is a flowchart illustrating a method for printing an image file stored in a box according to an embodiment.

FIG. 22 is a flowchart illustrating a method for printing an image file stored in a box according to an embodiment. It is assumed in this example that an operator issues a print instruction through the operation panel of the image forming apparatus 104.

At step S2201, the CPU 501 detects a request for using an image forming apparatus 104 through the operation panel 508. At step S2202, the CPU 501 receives a user name and password inputted through the operation panel 508. At step S2203, the CPU 501 sends the inputted user name and password to the user authentication server 102.

At step S2203, the CPU 501 inquiries of the user authentication server 102 about the authentication of the operator by sending the inputted authentication information to it. At step S2204, the CPU 401 determines whether the user login is successful. For example, if the user authentication server 102 successfully authenticates the authenticity of the user, the CPU 401 determines that the login is successful. If the login fails, the process proceeds to step S2205, where the CPU 501 displays an error message on the operation panel 508 indicating that the user cannot login.

On the other hand, if the login is successful, the process proceeds to step S2206, where the CPU 501 displays the initial screen on the operation panel 508. When a box function key 702 on the operation panel 508 is pressed, the CPU 501 displays a box selection screen (FIG. 9) on the operation panel 508. Then, when any of the boxes is selected, the CPU 501 displays a document selection screen (FIG. 10) on the operation panel 508. The CPU 501 then receives a selection of an electronic document (job document) to be printed.

At step S2207, the CPU 501 sends the job document to the directory server 101 along with license information held with the job document. Information such as the operator's user name is also sent. At step S2208, The CPU 501 obtains operation right information from the directory server 101.

When the CPU 501 detects depression of a print key 1003 displayed on the operation panel 508 at step S2209, the CPU 501 proceeds to step S2210. At step S2210, the CPU 501 determines whether the operation right information includes a print right. If the operator who has logged in does not have a print right, the process proceeds to step S2211. The CPU 501 displays an error message on the operation panel 508 indicating the printing is not permitted. On the other hand, if printing is permitted, the process proceeds to step S2212, where the CPU 501 reads the job document from the box and sends it to the printer unit 506. Thus, the desired job document is printed.

This embodiment is advantageous in that the job document generated on the image forming apparatus 104 for printing can be reused only by the authorized operator. An operator without a legitimate right for the original electronic document cannot perform operations on the job document, of course.

<Printing Variation>

The embodiment above has been described with respect to an example in which permission/inhibition of printing of a job document stored in a box is appropriately controlled. A right to perform stamp printing or a right to add information such as a user name to a header or footer may be added as an operation right.

FIG. 23 shows another exemplary operation right database according to an embodiment. It can be seen from comparison with the database shown in FIG. 2 that operation right information concerning print settings is added to the database.

Figure 24:
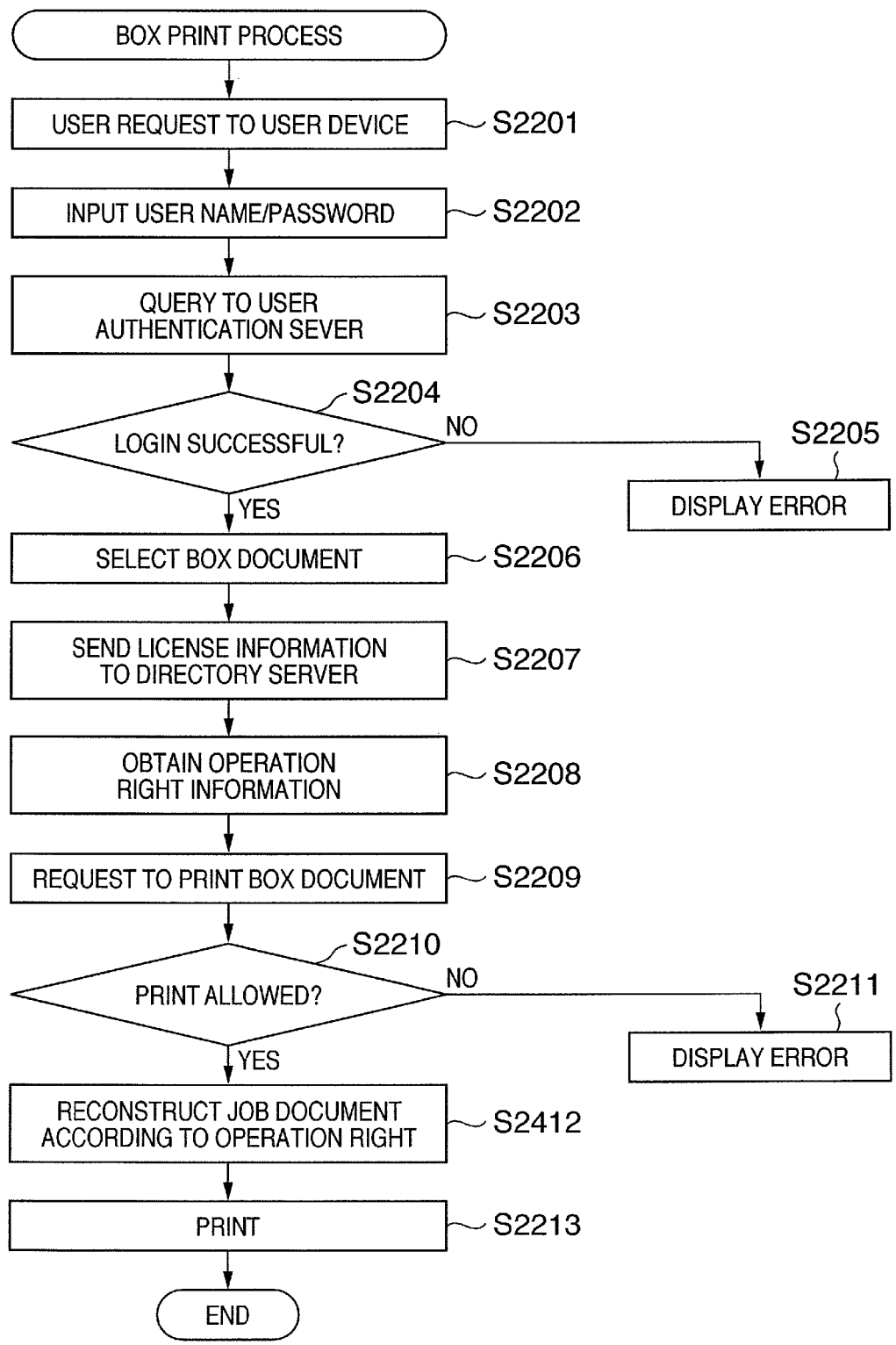
FIG. 24 is a flowchart illustrating another exemplary method for printing an image file stored in a box according to an embodiment.

FIG. 24 is a flowchart illustrating another example of a method for printing an image file stored in a box according to the embodiment. The steps already described are labeled with the same reference numerals for the sake of simplifying explanation.

At step S2208, information about print settings is also obtained from the directory server 101. If the operator has a print right, the process proceeds from step S2210 to step S2412. The CPU 501 reconstructs a job document stored in a box for printing. If an image cannot be reconstructed according to an operation right, the print job can be canceled.

For example, user B holding the license information shown in FIG. 3 requests to print the job document. Because user B has a right to print the document, user B can print the document. The operation right requires user B to add a tamp inhibiting copying of the document as a print setting. Accordingly, the CPU 501 superimposes an image indicating copy inhibit on the background of the job document. At step S2212, the CPU 501 prints the reconstructed job document.

This embodiment enables image generation according to an operation right of an operator by reconstructing a job document in accordance with the operation right. For example, an image having a copy protection image added on the background of a job document can be generated on a recording medium.

<Transmission of a Job Document Stored in a Box>

Figure 25:
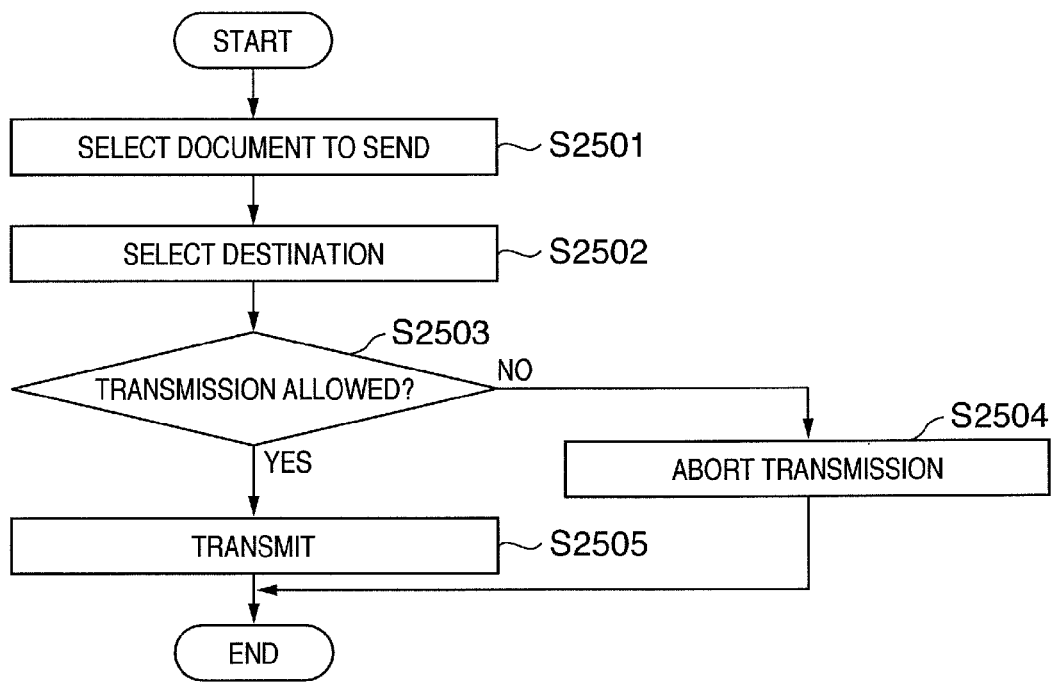
FIG. 25 is a flowchart illustrating transmission of a job document stored in a box according to an embodiment.

FIG. 25 is a flowchart illustrating transmission of a job document stored in a box according to an embodiment. When an operator presses a box function key 702 on the operation panel 508, the CPU 501 displays a box function basic screen (FIG. 9) on the operation panel 508. Then, when button 901b is selected on the box function basic screen, the CPU 501 displays a job document list screen (FIG. 10) on the operation panel 508.

At step S2501, the CPU 501 receives a selection of an electronic document to be sent through the operation panel 508. The CPU 501 highlights the selected electronic document name. When the CPU 501 detects depression of send button 1010, the CPU 501 performs a process for selecting a destination at step S2502. For example, the CPU 501 displays a destination table (FIG. 11) on the operation panel 508 and waits until a destination is selected. More than one destination may be selected. When any of the destinations is selected and then the enter button 1104 is pressed, the process proceeds to step S2503.

At step S2503, the CPU 501 determines whether the selected electronic document is allowed to be sent to the selected destination. For example, if the operation restriction placed on the selected electronic document can be obeyed at the destination, the CPU 501 determines that the electronic document is allowed be sent to the destination. On the other hand, if the restriction cannot be obeyed at the destination, the CPU 501 determines that the electronic document is not allowed to be sent.

For example, if the receiving device at the destination is capable of interpreting license information added to the general-format document, the CPU 501 determines that the document can be sent to the destination; otherwise, it determines that the document cannot be sent. Determination as to whether the destination device is capable of interpreting license information can be made on the basis of information contained in an address book, for example, held on the image forming apparatus 104 that indicates whether the device is capable of interpreting license information.

If the CPU 501 determines that the operation restriction cannot be obeyed, it proceeds to step S2504, where the CPU 501 aborts transmission process and displays an error message on the operation panel 508 indicating that the electronic document is not allowed to be sent. On the other hand, if the CPU 501 determines that the operation restriction is obeyed at the destination, the CPU 501 proceeds to step S2505, where the CPU 501 sends the electronic document to the destination. The CPU 501 then displays a message on the operation panel 508 indicating that the document has been successfully sent.

Figure 26:
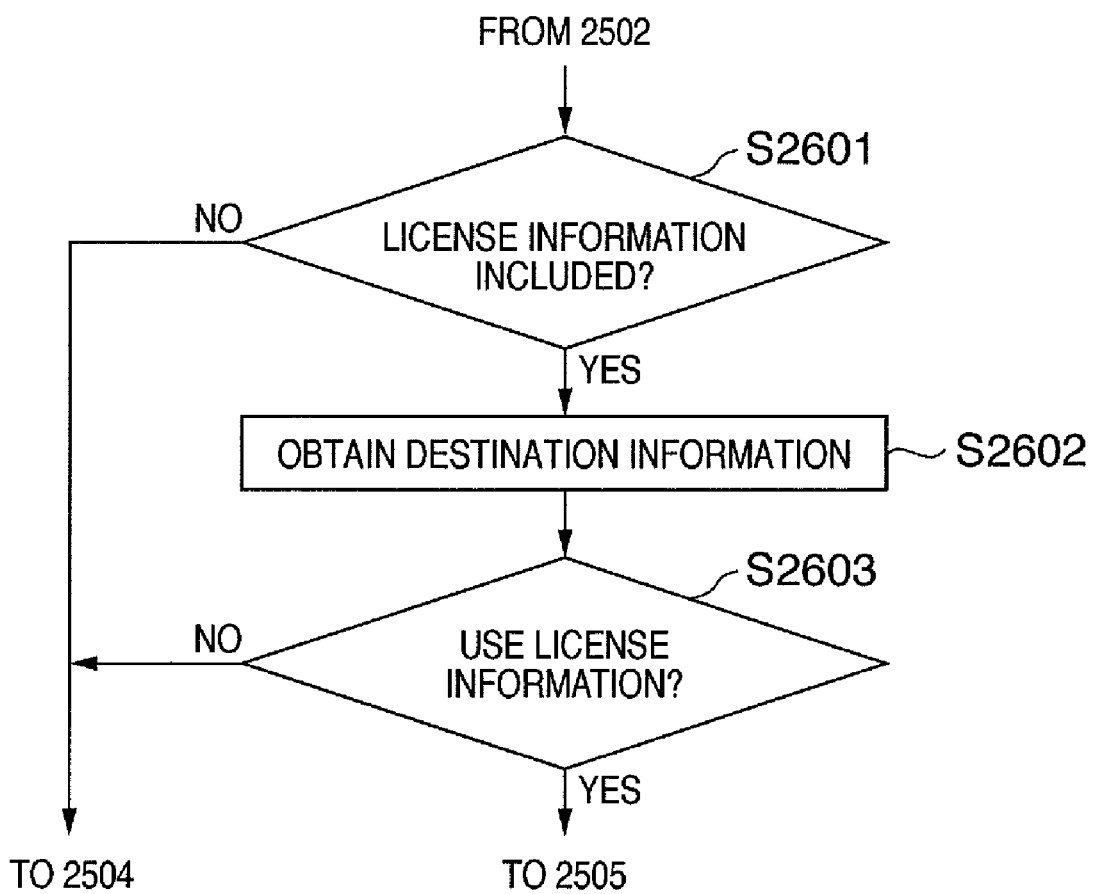
FIG. 26 is a flowchart illustrating an example of transmission determining process according to an embodiment.

FIG. 26 is a flowchart showing an example of a transmission determination process according to an embodiment. The flowchart shows step S2503 of FIG. 25 as a subroutine.

At step S2601, the CPU 501 of the image forming apparatus 104 determines whether a selected electronic document is a secure document. For example, the CPU 501 refers to a document management table 1201 to determine whether license information is associated with the selected electronic document.

If the electronic document is not associated with license information, the process proceeds to step S2504 to abort the transmission process. On the other hand, if the electronic document is associated with license information, the process proceeds to step S2602, where the CPU 501 obtains destination information on the selected destination. Destination information in this embodiment may be the type of transmission method, the destination name, and destination information (FIG. 11). It will be understood that the present invention is not limited to these items of information.

At step S2603, the CPU 501 refers to the type of transmission method among the obtained items of information about the destination to determine whether the license information associated with the electronic document can be used at the destination. For example, if the transmission method represents e-mail, FTP (File Transfer Protocol), SMB (Service Message Block), or box document transmission, it is determined that the license information can be used at the destination. Then, the process proceeds to step S2505.

On the other hand, if the transmission method is facsimile transmission or the like, the license information cannot be used at the destination. That is, if such a transmission method were used, the electronic document would be sent to the destination as image data and would be printed on a recording medium. Thus, the operation restriction based on license information could not work. Therefore, if the transmission method is facsimile transmission, the CPU 501 determines that license information cannot be used at the destination and proceeds to step S2504.

Figure 27:
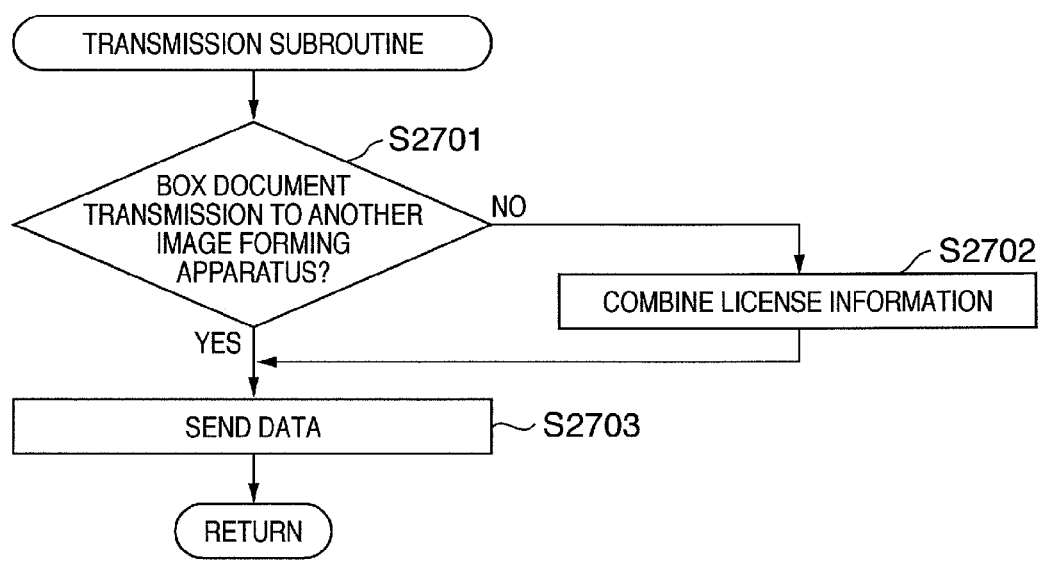
FIG. 27 is a flowchart illustrating an example of an electronic document transmission process (S2505) according to an embodiment.

FIG. 27 is a flowchart showing an example of the electronic document transmission operation (S2505) according to the embodiment. For convenience of explanation, the transmission operation (S2505) is illustrated as a subroutine.

At step S2701, the CPU 501 refers to the type of transmission method included in information about the destination to determine whether the transmission is box document transmission to another image forming apparatus. If it is box document transmission, the CPU 501 proceeds to step S2703, where it sends the electronic document and license information as is. This is because if the destination is an image forming apparatus, operation restriction control based on license information can work.

For a transmission method, such as e-mail transmission, that is not box document transmission, the process proceeds to step S2702. At step S2702, the CPU 501 combines the electronic document with the license information. The process then proceeds to step S2703, where the CPU 501 sends the combined electronic document with license information to the destination.

As has been described, according to this embodiment, only if operation right information added to an electronic document can be used at the destination, the transmission of the electronic document is permitted. Transmission such as facsimile transmission to a destination where control operations on documents cannot be restricted is prohibited. Thus, the confidentiality of electronic documents can be appropriately ensured according to destinations.

Other Embodiments

Various embodiments of the present invention have been described. The present invention can be applied to a system consisting of multiple devices or may be applied to an apparatus formed by only a single device. For example, the present invention can be applied to a scanner, a printer, a personal computer, a copying machine, a facsimile machine, or a multifunctional machine.

The present invention can be accomplished by supplying a software program code that implements the functions of any of the embodiments described above directly or remotely to a system or apparatus and causing a computer included in the system or apparatus to read and execute the supplied program code.

Therefore, the program code itself installed in the computer to implement the functions and processing of the present invention also implements the present invention. That is, the computer program itself for implementing the functions and processing described above is also included in the present invention.

The program may be in any form, such as an object code, a program executed by an interpreter, or script data to be provided to an OS, that has the functions described above.

The recording medium for supplying the program may be a flexible disk, hard disk, optical disk, magneto-optical disk, MO, CD-ROM, CD-R, or CD-RW. Alternatively, the recording medium may be a magnetic tape, a non-volatile memory card, ROM, or DVD (DVD-ROM or DVD-R).

The program may be downloaded from a Web page on the Internet by using a browser of a client computer. That is, the computer program of the present invention or its compressed file including an automatic install function may be downloaded from the Web page to a recording medium such as a hard disk. Furthermore, the program code constituting the program of the present invention may be divided into files. The files may be downloaded from different Web pages. In other words, the present invention may include a WWW server from which a number of users can download the program files that implements the functions and processing of the present invention on their computers.

The program of the present invention may be encrypted, stored on a storage medium such as a CD-ROM, and distributed on the CD-ROM to users. In this case, users who satisfy predetermined requirements may be allowed to download key information for decrypting the encryption from a Web page over the Internet. Then the users may use the key information to decrypt the program and install and execute the decrypted program.

The functions of any of the embodiments described above may be implemented by a computer reading and executing the program. An OS or other system running on the computer may perform part or all of actual processing according to instructions of the program. In this case, of course, the functions of any of the embodiments described above can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus, comprising:
    a storage unit capable of storing first image data, second image data and management information indicating at least information about an attribute of the second image data, wherein the second image data is related to the first image data and is in a format different from that of the first image data;
    an acquiring unit which transmits license information on the first image data to a server connected to the information processing apparatus and acquires information on the operation restriction applied on the first image data sent from the server;
    an assigning unit which assigns attribute information based on the acquired information on the acquired operation restriction to the second image data; and
    a restricting unit which restricts an operation on the second image data based on the attribute information assigned to the second image data by the assigning unit.

2. The information processing apparatus according to claim 1, wherein the first image data is image data derived from the second image data or the second image data is image data derived from the first image data.

3. The information processing apparatus according to claim 2, further comprising:
    an image data generating unit which generates the second image data from an original image inputted to said image data generating unit; and
    a file converting unit which converts the second image data into the first image data.

4. The information processing apparatus according to claim 2, further comprising an image data generating unit which receives print job data including the first image data and converts the received print job data to generate the second image data.

5. The information processing apparatus according to claim 1, wherein said restricting unit comprises an encrypting unit which encrypts the second image data.

6. The information processing apparatus according to claim 1, further comprising a display unit which displays a thumbnail image based on second image data related to a piece of first image data that is not prohibited to be displayed among the pieces of first image data stored in the storage unit.

7. A method performed in an information processing apparatus, comprising the steps of:
    storing in a storage unit first image data, second image data and management information indicating at least information about an attribute of the second image data, wherein the second image data is related to the first image data and is in a format different from that of the first image data;
    transmitting license information on the first image data to a server connected to the information processing apparatus and acquiring information on the operation restriction applied on the first image data sent from the server;
    assigning attribute information based on the acquired information on the acquired operation restriction to the second image data; and
    restricting an operation on the second image data based on the attribute information assigned to the second image data.

8. A non-transitory computer-readable storage medium storing, in executable form, a program for causing an information processing apparatus to implement a method, the method comprising the steps of:
    storing in a storage unit first image data, second image data and management information indicating at least information about an attribute of the second image data, wherein the second image data is related to the first image data and is in a format different from that of the first image data;
    transmitting license information on the first image data to a server connected to the information processing apparatus and acquiring information on the operation restriction applied on the first image data sent from the server;
    assigning attribute information based on the acquired information on the acquired operation restriction to the second image data; and
    restricting an operation on the second image data based on the attribute information assigned to the second image data.

* * * * *